United States Patent [19]
Yamagishi et al.

[11] Patent Number: 5,477,348
[45] Date of Patent: Dec. 19, 1995

[54] ACHROMATIC HOLOGRAM OPTICAL SYSTEM

[75] Inventors: Fumio Yamagishi, Ebina; Satoshi Maeda, Hadano; Hiroyuki Ikeda, Yokohama; Masayuki Kato, Atsugi; Hirokazu Aritake, Isehara, all of Japan

[73] Assignee: Fujitsu Limited, Kawasaki, Japan

[21] Appl. No.: 191,716

[22] Filed: Feb. 4, 1994

Related U.S. Application Data

[63] Continuation of Ser. No. 674,321, filed as PCT/JP90/01201, Sep. 19, 1990, published as WO91/04519, Apr. 4, 1991, abandoned.

[30] Foreign Application Priority Data

Sep. 19, 1989 [JP] Japan .................................. 1-240720
Jul. 9, 1990 [JP] Japan .................................. 2-179437

[51] Int. Cl.⁶ .................................................... G02B 5/32
[52] U.S. Cl. .......................... 359/19; 359/8; 359/15; 359/22; 359/24
[58] Field of Search .......................... 359/8, 15, 19, 359/22, 24

[56] References Cited

U.S. PATENT DOCUMENTS

| | | | |
|---|---|---|---|
| Re. 20,748 | 6/1938 | Bocca | 359/569 |
| 2,182,993 | 12/1939 | Moreno | 359/569 |
| 2,189,751 | 2/1940 | Bocca et al. | 359/574 |
| 3,716,666 | 2/1973 | Larsen | 359/566 |
| 3,821,795 | 6/1974 | Okano | 359/569 |
| 3,940,788 | 2/1976 | Abe et al. | 359/569 |
| 4,384,210 | 5/1983 | Stauffer | 359/569 |
| 4,458,980 | 7/1984 | Ohki et al. | |
| 4,497,534 | 2/1985 | Sincerbox | |

(List continued on next page.)

FOREIGN PATENT DOCUMENTS

| | | |
|---|---|---|
| 214018 | 3/1987 | European Pat. Off. |
| 59-160166 | 9/1984 | Japan. |
| 61-7003 | 4/1986 | Japan. |
| 61-278820 | 12/1986 | Japan. |
| 62-4778 | 1/1987 | Japan. |
| 62-139145 | 6/1987 | Japan. |
| 62-234117 | 10/1987 | Japan. |
| 63-77003 | 4/1988 | Japan. |
| 63077003 | 4/1988 | Japan. |
| 63-155432 | 6/1988 | Japan. |
| 63-200328 | 8/1988 | Japan. |
| 63-194222 | 8/1988 | Japan. |
| 2212937 | 8/1989 | United Kingdom. |

OTHER PUBLICATIONS

Kogelnik, "Coupled Wave Theory for Thick Hologram Gratings", Bell System Tech. J., vol. 48, No. 9, Nov. 1969, pp. 2909–2947.

John N. Latta; *Analysis of Multiple Hologram Optical Elements with Low Dispersion and Low Aberrations,* Applied Optics, vol. 11, No. 8, Aug. 1972, New York, pp. 1686–1696.

Applied Physics Letters, vol. 9, No. 12, Dec. 15, 1966, ©1966 American Institute of Physics, "White–Light Viewing of Surface Holograms by Simple Dispersion Compensation", D. J. De Bitetto, pp. 417–418.

Optics Communications, vol. 58, No. 6, Jul. 15, 1986, ©Elsevier Science Publishers B. V., "Real and Achromatic Imaging With Two Planar Holographic Optical Elements", I. Weingartner, pp. 385–388.

Applied Optics, vol. 11, No. 8, Aug. 1972, "Analysis of Multiple Hologram Optical Elements with Low Dispersion and Low Aberrations", John N. Latta, pp. 1686–1696.

Optics, "The Propagation of Light", Eugene Hecht/Alfred Zajac, pp. 60–63.

*Primary Examiner*—Georgia Y. Epps
*Assistant Examiner*—Michael A. Papalas
*Attorney, Agent, or Firm*—Staas & Halsey

[57] ABSTRACT

An achromatic hologram optical system for converting a wave front A into a wave front B. Two holograms ($H_1$ and $H_2$) are provided. The length of an optical path from an equiphase front of the wave front A to an equiphase front of the wave front B is constant, and each of the two holograms has a curved surface shape.

50 Claims, 15 Drawing Sheets

U.S. PATENT DOCUMENTS

| | | | |
|---|---|---|---|
| 4,550,973 | 11/1985 | Hufnagel . | |
| 4,613,200 | 9/1986 | Hartman . | |
| 4,786,124 | 11/1988 | Stone et al. | 359/15 |
| 4,795,236 | 1/1989 | Ise | 359/569 |
| 4,832,427 | 5/1989 | Nanba et al. | 359/15 |
| 4,832,464 | 5/1989 | Kato et al. | 359/19 |
| 4,834,474 | 5/1989 | George et al. | 359/8 |
| 4,850,662 | 7/1989 | Chen | 359/15 |
| 5,016,954 | 5/1991 | Onayama et al. | 359/569 |
| 5,039,183 | 8/1991 | Meyers | 359/19 |
| 5,081,545 | 1/1992 | Sugawara et al. | 359/625 |

$$f_2\lambda = \sin\theta_{2B} + \sin\theta_3$$
$$= \delta\varphi_2/\delta x_2 + \delta\varphi_3/\delta x_2$$
$$= d\varphi_2/dx_2 + \delta\varphi_3/\delta x_2$$

$$f_1\lambda = \sin\theta_1 - \sin\theta_{2A}$$
$$= \delta\varphi_1/\delta x_1 - \delta\varphi_2/\delta x_1$$
$$= d\varphi_1/dx_1 - \delta\varphi_2/\delta x_1$$

SPHERICAL FRONT

IMAGE POINT $$\varphi_1 + \varphi_2 + \varphi_3 = C_1$$

$$\varphi_3 + \varphi_4 = C_2$$

$$\therefore \varphi_1 + \varphi_2 - \varphi_4 = C_3$$

$$\varphi_1 + \varphi_2 = \varphi_4 + C$$

$f = 1/d$

ACHROMATIC HOLOGRAM OPTICAL SYSTEM

This application is a continuation of application No. 07/674,321, filed as PCT/JP90/01201, Sep. 19, 1990, published as WO91/04519, Apr. 4, 1991, now abandoned.

BACKGROUND OF THE INVENTION

The present invention relates to a hologram employing an optical system that can prevent a chromatic aberration and can be adopted for POS (point of sales) terminals, laser printers, optical heads, and head-up displays, etc.

A hologram is a thin film about several micrometers in thickness. Although lightweight and compact, it has a wave front converting function equivalent or superior to that of a lens. With the use of a duplicate technique, optical hologram elements can be mass-produced at a low cost. Recently therefore, optical apparatuses such as POS scanners, laser printers, and optical heads that employ holograms have been studied and developed. Further, head-up displays employing these holograms have been widely developed for airplanes and automobiles.

When the hologram is regenerated with a light source such as a He-Ne laser having a single wavelength which does not fluctuate, a problem of chromatic aberration does not occur. When the light source is a semiconductor laser having a wavelength which fluctuates, or an incoherent light source such as a fluorescent tube having a wavelength which is dispersed, the problem of chromatic aberration may arise. As shown in FIG. 23, a hologram 10 has a spatial frequency (pitch d). When the hologram is irradiated with light having a wavelength of $\lambda_0$ at an incident angle $\theta_1$, a light outgoing angle is inevitably changed depending on the wavelength. Although this sort of angular change may occur in a standard glass lens, a change caused by the hologram is usually ten times as large as that caused by the glass lens. That is, the hologram causes a conspicuous chromatic aberration. To reduce this aberration, FIG. 24 shows a combination of two holograms 10A and 10B, whereby directional changes of light due to the wavelength thereof are made opposite to each other through the holograms, to thereby cancel the aberration.

Reducing the chromatic aberration with use of two holograms is well known. For example, in Applied Physics Letter (Vol. 9, p. 417, 1966) D. J. De Bitetto explains a method for reducing the chromatic aberration of a hologram by employing transmission type holograms arranged in parallel with each other.

In Applied Optics (Vol. 11, p. 1686, 1972) J. N. Latta describes an in-line type chromatic aberration correcting hologram optical system employing two or three holograms. The in-line hologram system has a problem of a low light usage efficiency. To improve the efficiency, an off-axis achromatic optical system is needed.

Another in-line type achromatic hologram optical system is proposed, for example, by I. Weingartner in Optics Communication (Vol. 58, p. 385, 1986). This reference proposes a structure for cutting off the center of incident light flux or a structure for cutting off the center of an outgoing light flux to use part of a normal Gaussian beam. The former structure has a problem of poor light usage efficiency, and the latter has difficulty in converging a beam. To solve these problems, Japanese Unexamined Patent Publication No. 61-77003 "Grating Lens Optical System" discloses an achromatic structure employing two parallel transmission type holograms. This structure is characterized in that light diffracted by a first hologram once intersects an optical axis, but since light distribution is inverted through a second hologram, this structure also has difficulty in converging a light beam.

Accordingly, there is no in-line achromatic hologram optical system that can provide a sufficient light efficiency and beam convergence, and therefore, it is necessary to develop such a system.

U.S. Pat No. 4,613,200 discloses a "Head-up Display System with Holographic Dispersion Correcting" employing two off-axis type reflective holograms. The two holograms are arranged in parallel with each other, and each has the same structure to correct a chromatic aberration. It is, however, often impossible to arrange the two holograms in parallel with each other in a display unit, due to structural limitations. This disclosure, therefore, is not adequate when arranging an apparatus. In addition, when the light that joins the two holograms is not a plane wave, a chromatic aberration occurs.

Japanese Unexamined Patent Publication No. 63-194222 proposes a display unit employing two non-parallel reflective holograms. The two holograms are specifically arranged to correct a chromatic aberration. This optical system can correct the chromatic aberration when the light that joins the two holograms is a plane wave but does not sufficiently correct the same if the light is not a plane wave. The joining plane wave, however, raises a problem of a structural limitation of the apparatus, which will not be compact.

Therefore, it is desired to develop an achromatic hologram optical system employing two non-parallel holograms, without plane wave light joining the two holograms.

Japanese Unexamined Patent Publication No. 63-77003 discloses an optical structure for eliminating the chromatic aberration. This disclosure is limited to a special wave front and a special optical system, and is not generally applicable to an optical structure that converts an optional wave front A into a wave front B.

SUMMARY OF THE INVENTION

An object of the present invention is to determine laws governing an achromatic hologram optical system, and according to these laws, provide a novel achromatic hologram optical system.

To achieve the above object, the present invention provides an achromatic hologram optical system comprising two holograms for converting a wave front A into a wave front B. According to the invention, the length of an optical path from an equiphase front of the wave front A to an equiphase front of the wave front B is constant, and each of the two holograms has a curved surface shape.

DESCRIPTION OF THE PREFERRED EMBODIMENTS

Figure 1:
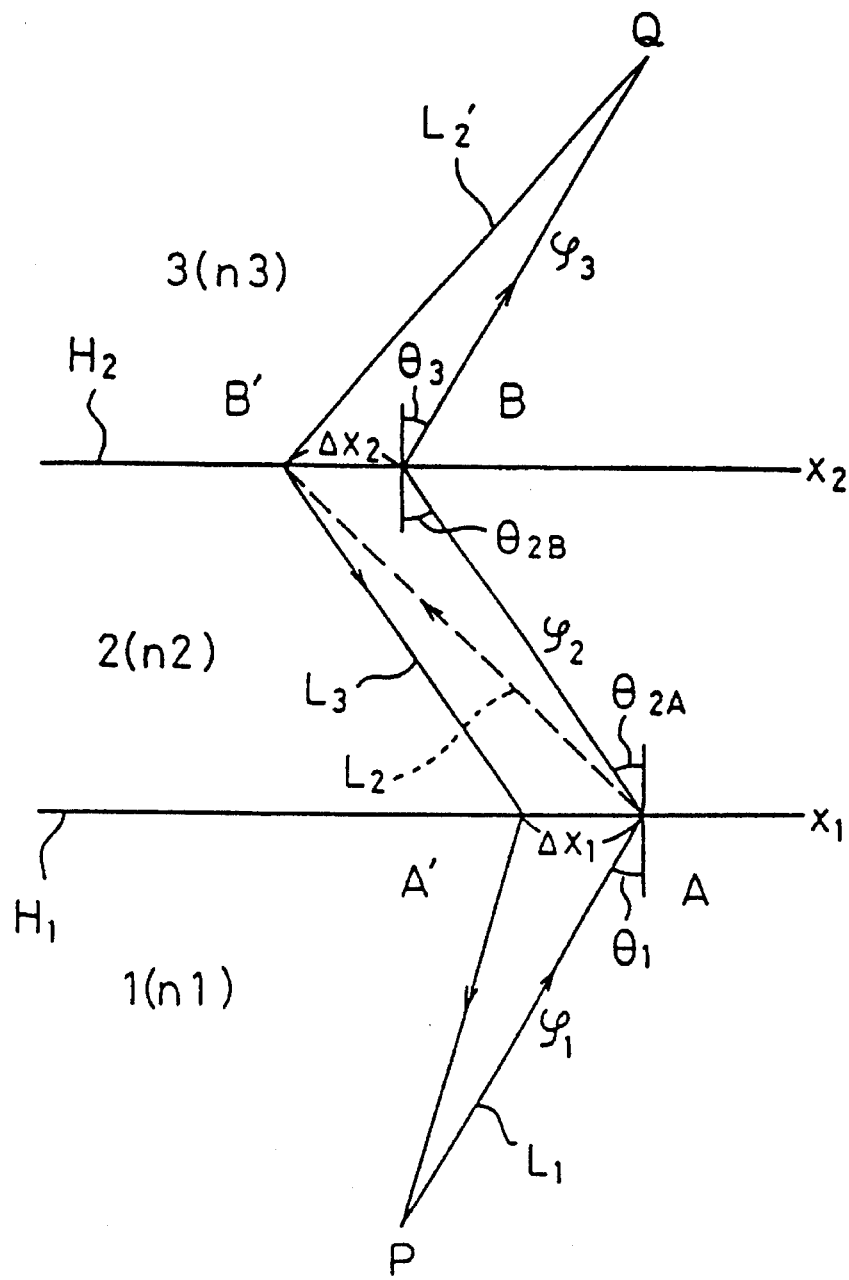
FIG. 1 is a diagram of a hologram optical system according to the present invention.
Figure 2:
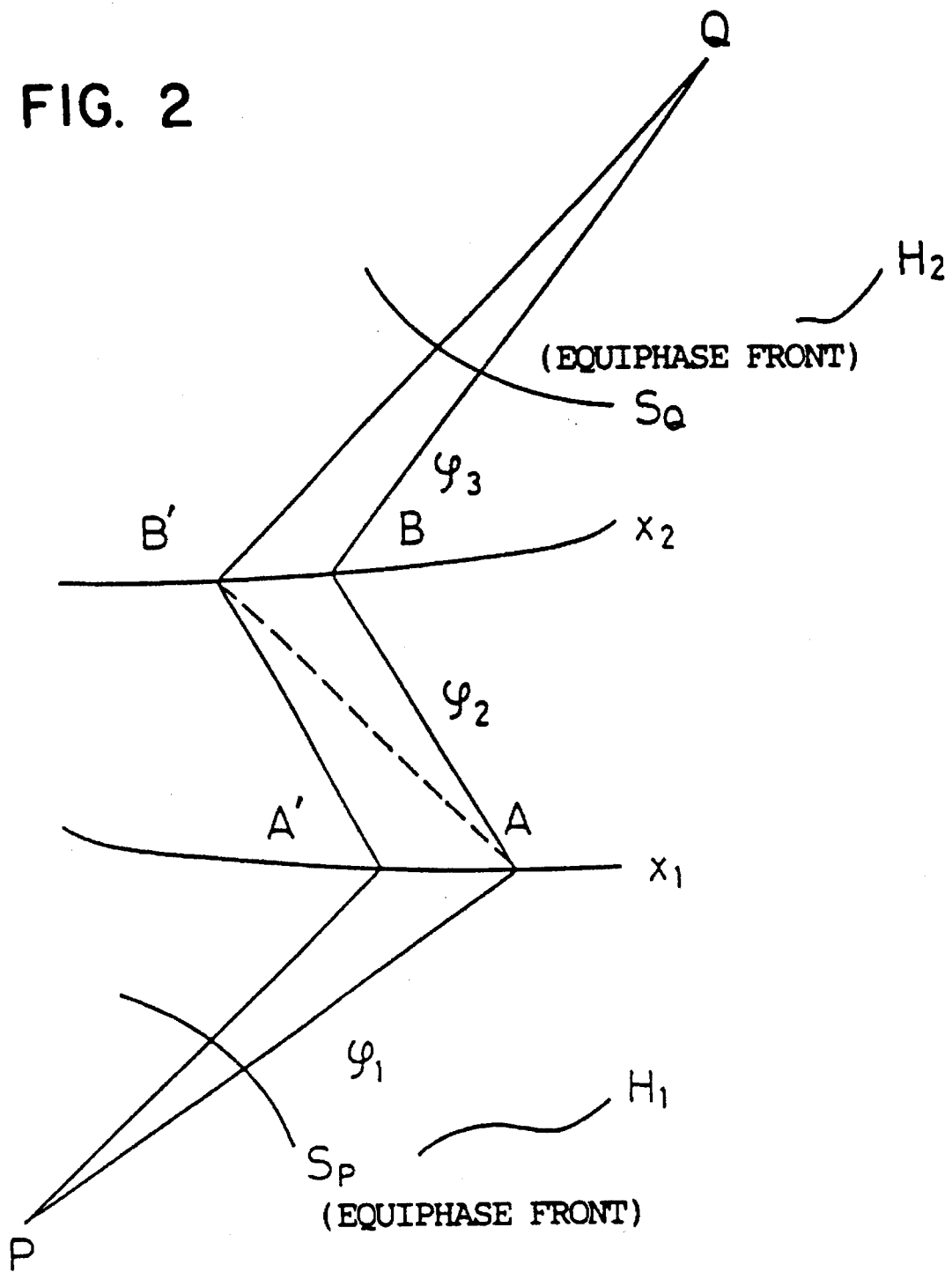
FIG. 2 is a diagram of a general arrangement of the hologram optical system in FIG. 1.

FIGS. 1 and 2 are diagrams of the principle of a mode of operation and of the present invention.

In FIG. 1, to simplify the explanation, the two holograms are the same flat plates arranged in parallel with each other. As will be explained later, the holograms may have other shapes such as the curved shapes shown in FIG. 2.

FIG. 1 shows holograms $H_1$ and $H_2$ for converting a point light source P (a divergent spherical wave front) into a point light source Q (convergent spherical wave front). For simplicity, the holograms are each one-dimensional.

(1) Basic Relations for Analysis

For simplicity, a one-dimensional structure is first considered. As shown in FIG. 1, the first hologram lens $H_1$ having a spatial frequency of $f_1(x_1, x_2)$ and the second hologram lens $H_2$ having a spatial frequency of $f_2(x_1, x_2)$ are arranged between the divergence point P and the convergence point Q. The two lenses define zones 1, 2, and 3.

Along the first and second hologram lenses, coordinates $x_1$ and $x_2$ are defined.

A light beam $L_1$ passing through the two lenses is considered. The light beam intersects the lenses $H_I$ and $H_2$ at points A and B, which define distances PA, AB, and BQ. The total length $\psi$ of the optical path is given by the following equations:

$$\psi = \psi_1 + \psi_2 + \psi_3 \tag{1}$$

$$\psi_1 = PA \cdot n_1 = \psi_1(x_1)$$

$$\psi_2 = AB \cdot n_2 = \psi_2(x_1, x_2)$$

$$\psi_3 = BQ \cdot n_3 = \psi_3(x_2)$$

where $n_1$, $n_2$, and $n_3$ denote refractive indexes of the zones 1, 2, and 3 respectively.

The spatial frequencies $f_1(x_1, x_2)$ and $f_2(x_1, x_2)$ are given by the following equations through differentiation of the length of the optical path:

$$f_1(x_1, x_2)\lambda = g_1 + g_{2A}(x_1, x_2) \tag{2}$$

$$f_2(x_1, x_2)\lambda = g_{2B}(x_1, x_2) + g_3(x_2) \tag{3}$$

$$g_1(x_1) = \delta\psi_1/\delta x_1 = \sin\theta_1 \tag{4}$$

$$g_3(x_2) = \delta\psi_3/\delta x_2 = \sin\theta_3 \tag{5}$$

$$g_{2A}(x_1, x_2) = \delta\psi_2/\delta x_1 = \sin\theta_{2A} \tag{6}$$

$$g_{2B}(x_1, x_2) = \delta\psi_2/\delta x_2 = \sin\theta_{2B} \tag{7}$$

where $\lambda$ is a wavelength, $\theta_1$ and $\theta_{2A}$ are an incident angle and an outgoing angle of the first lens respectively, and $\theta_{2B}$ and $\theta_3$ are an incident angle and an outgoing angle of the second lens, respectively. A sign of $\theta$ is positive in a clockwise direction, and the spatial frequency f is positive when it provides a deflecting action in a counterclockwise direction.

(2) Relationships for Optical Path in Wavelength Insensitivity

When a wavelength changes by $\Delta\lambda$ from $\lambda$ to $\lambda+\Delta\lambda$, a light beam $L_2$ diffracted by the first lens changes its position from B to B' while $x_2$ changes to $x_2+\Delta x_2$. At this time, the following equation will be established between $\Delta\lambda$, $\Delta x_2$, and $f_1$ from the equation (2):

$$f_1(x_1, x_2)\Delta\lambda = \{\delta g_{2A}(x_1, x_2)/\delta x_2\}\Delta x_2 \tag{8}$$

If a light beam $L_2'$ diffracted at $x_1$ is diffracted to the point Q at $x_2+\Delta x_2$ (B') after the change of the wavelength, the following equation will be established between $\Delta\lambda$, $\Delta x_2$, $\Delta f_2$, and $f_2$ from the equation (3):

$$\Delta f_2(x_1, x_2)\lambda + f_2(x_1, x_2)\Delta\lambda = \{\delta g_3(x_2)/\delta x_2 + \delta g_{2B}(x_1, x_2)/\delta x_2\}\Delta x_2 \tag{9}$$

where the fine quantity $\Delta f_2(x_1, x_2)\Delta\lambda$ is ignorable.

At the wavelength $\lambda$, a light beam $L_3$ passes from the point Q through B' and A' and to the point P. The point A' has a coordinate of $x_1+\Delta x_2$, and the following equation is obtainable for $\Delta f_2$, $\Delta x_2$, and $\Delta x_1$ from the equation (3):

$$\Delta f_2(x_1, x_2)\lambda = \tag{10}$$

$$\{\delta g_3(x_2)/\delta x_2 + \delta g_{2B}(x_1, x_2)/\delta x_2\}\Delta x_2 + \{\delta g_{2B}(x_1, x_2)/\delta x_1\}\Delta x_1$$

From the equations (9) and (10), the following equation is obtained for $f_2$, $\Delta\lambda$, and $\Delta x_1$:

$$\Delta f_2(x_1, x_2)\Delta\lambda = -\{\delta g_{2B}(x_1, x_2)\delta x_1\}\Delta x_1 \tag{11}$$

According to the equations (8) and (11), $\Delta\lambda$ is deleted, and the following equation is obtained for $f_1$, $f_2$, $\Delta x_1$, and $\Delta x_2$:

$$f_1(x_1, x_2)\{\delta g_{2B}(x_1, x_2)/\delta x_1\}\Delta x_1 + \tag{12}$$

$$f_2(x_1, x_2)\{\delta g_{2A}(x_1, x_2)/\delta x_2\}\Delta x_2 = 0$$

or $$\{g_1(x_1) + g_{2A}(x_1, x_2)\}\{\delta g_{2B}(x_1, x_2)/\delta x_1\}\Delta x_1 + \tag{13}$$

$$\{g_{2B}(x_1, x_2) + g_3(x_2)\}\{\delta g_{2A}(x_1, x_2)/\delta x_2\}\Delta x_2 = 0$$

From the equations (6) and (7), the following equation is generally established:

$$\delta g_{2A}(x_1, x_2)/\delta x_2 = \delta^2 \psi_2/\delta x_1 \delta x_2 = \delta g_{2B}(x_1, x_2)/\delta x_1 \quad (14)$$

Accordingly, the equations (12) and (13) are expressed as follows:

$$\Delta\psi = f_1(x_1, x_2)\Delta x_1 + f_2(x_1, x_2)\Delta x_2 = (\delta\psi_1/\delta x_1 + \delta\psi_2/\delta x_1)\Delta x_1 + (\delta\psi_2/\delta x_2 + \delta\psi_3/\delta x_2)\Delta x_2 = 0 \quad (15)$$

Then, the following is established:

$$\psi = \psi_1 + \psi_2 + \psi_3 = const. \quad (16)$$

This provides a rule that "wavelength insensitive lenses provide an optical path of a constant length."

(3) Wavelength Insensitivity in Optical Path of Constant Length

On the contrary, if the equation (16) is satisfied, an analysis of the wavelength insensitivity will be as follows.

From the equation (16) and the equation (15), i.e., the following equation is established:

$$f_1(x_1, x_2)\Delta x_1 + f_2(x_1, x_2)\Delta x_2 = 0 \quad (17)$$

If, due to the wavelength change $\Delta\lambda$, a diffracted light beam from the point P is diffracted at the point A toward a point B' $(x_2 + \Delta x_2)$, a diffraction equation at the point A will be as follows according to the equation (17):

$$\begin{aligned}
f_1(x_1, x_2)\Delta\lambda &= \delta(\delta\psi_2/\delta x_1)/\delta x_2 \times \delta x_2 \quad (18)\\
&= -(f_1/f_2)\delta(\delta\psi_2/\delta x_1)/\delta x_2 \times \Delta x_1\\
f_2(x_1, x_2)\Delta\lambda &= -\delta(\delta\psi_2/\delta x_1)/\delta x_2 \times \delta x_1
\end{aligned}$$

On the other hand, if, due to the wavelength change $\Delta\lambda$, a diffracted light beam from a point A" $(x_1 + \Delta x_1 - \Delta x_1')$ is diffracted at the point B' toward the point Q, the following equation is established:

$$(f_2 + \Delta f_2)\Delta\lambda = \delta(\delta\psi_2/\delta x_2)/\delta x_1 \cdot (-\Delta x_1') \quad (19)$$

where $\delta(\delta\psi_2/\delta x_1)/\delta x_2 = \delta(\delta\psi_2/\delta x_2)/\delta x_1$ so that the following equation is established:

$$\Delta x_1 = \Delta x_1' \quad (20)$$

This means that, with the wavelength change of $\Delta\lambda$, a light beam emitted from the point P passes through the points A(=A") and B' and reaches the point Q. Namely, a convergence point of a light beam does not change due to wavelength fluctuations. This provides a relationship that "a wavelength insensitive lens is obtained when the length of an optical path is constant."

(4) General Wave Front Shape and General Hologram Surface Shape

As shown in FIG. 2, a wave front emitted from an equiphase front Sp is diffracted by a first hologram $H_1$ having a smooth curved shape and by a second hologram $H_2$, and reaches an equiphase front Sq. In this case also, a similar analysis provides a relationship that "when the length of an optical path is constant, an equiphase front (a wave front) does not change due to wavelength fluctuations." If the length of the optical path changes from the constant value by an order of the wavelength (preferably less than $\lambda/4$), a chromatic aberration may be caused but to an extent that will not cause a problem in practical use.

Each of the embodiments shown in FIGS. 3 to 8 is a hologram system employing two transmission type holograms 11 and 13 for converting divergent light into divergent light.

Figure 9:
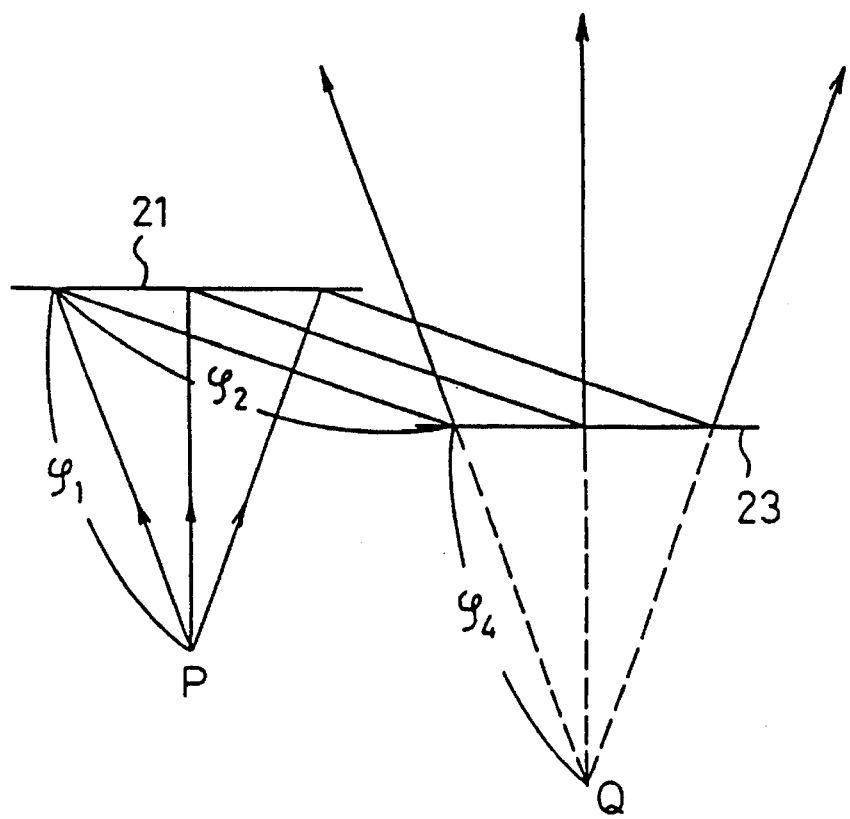
FIGS. 9 and 10 are diagrams of a sixth embodiment employing two reflection type holograms.
Figure 10:
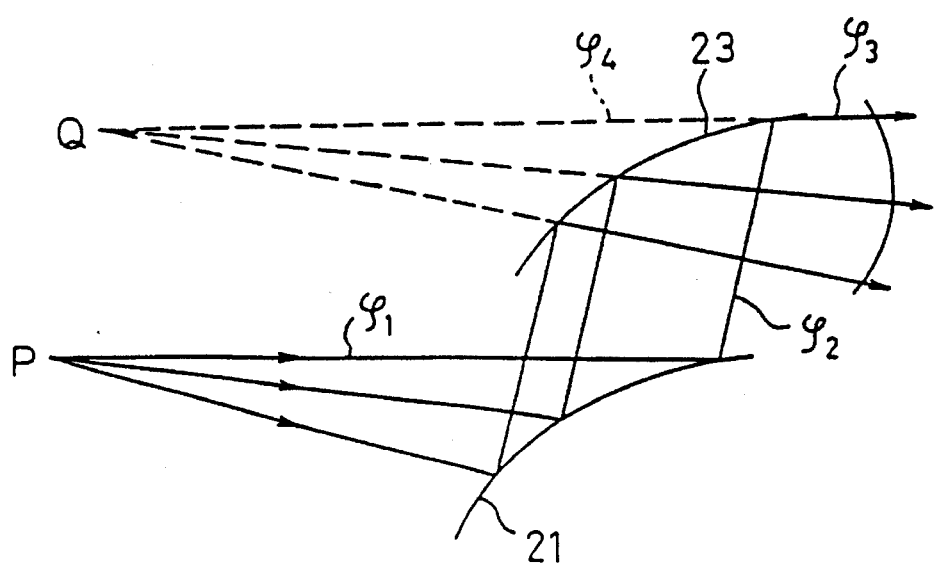

Each of the embodiments shown in FIGS. 9 and 10 is a hologram system employing two reflection type holograms 21 and 23 for converting divergent light into divergent light.

Figure 11:
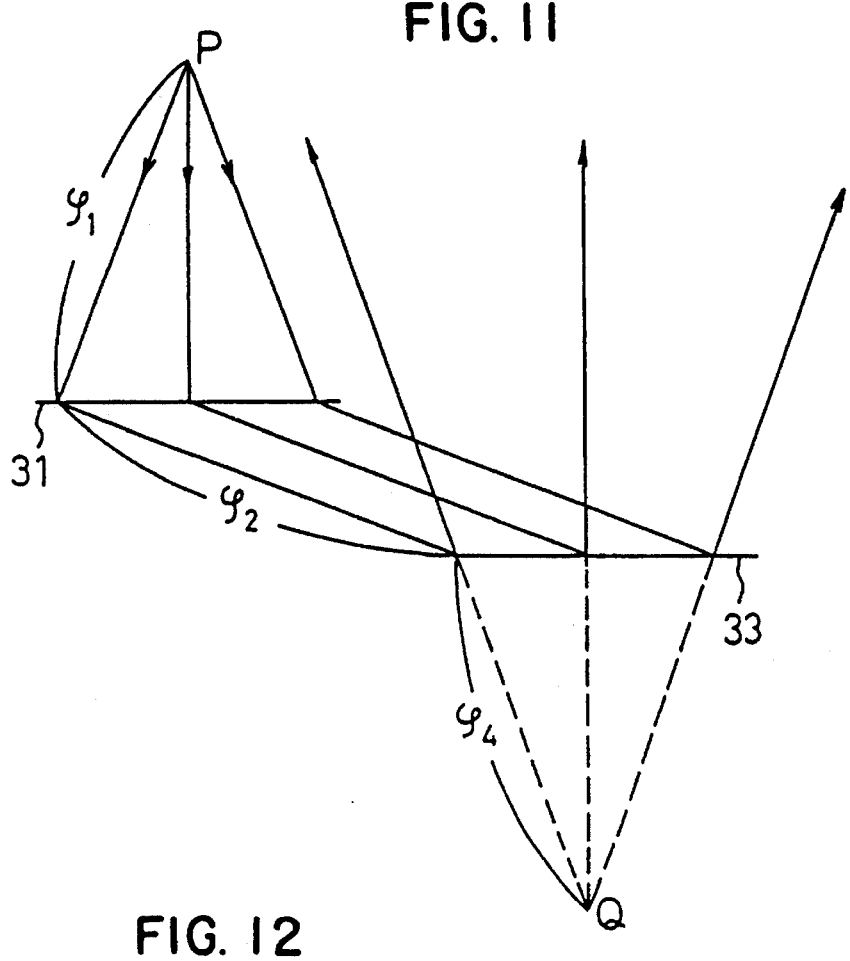
FIGS. 11 and 12 are diagrams of a seventh embodiment employing a combination of a transmission type hologram and a reflection type hologram.

The embodiment of FIG. 11 is a hologram optical system employing a transmission type hologram 31 and a reflection type hologram 33.

Figure 12:
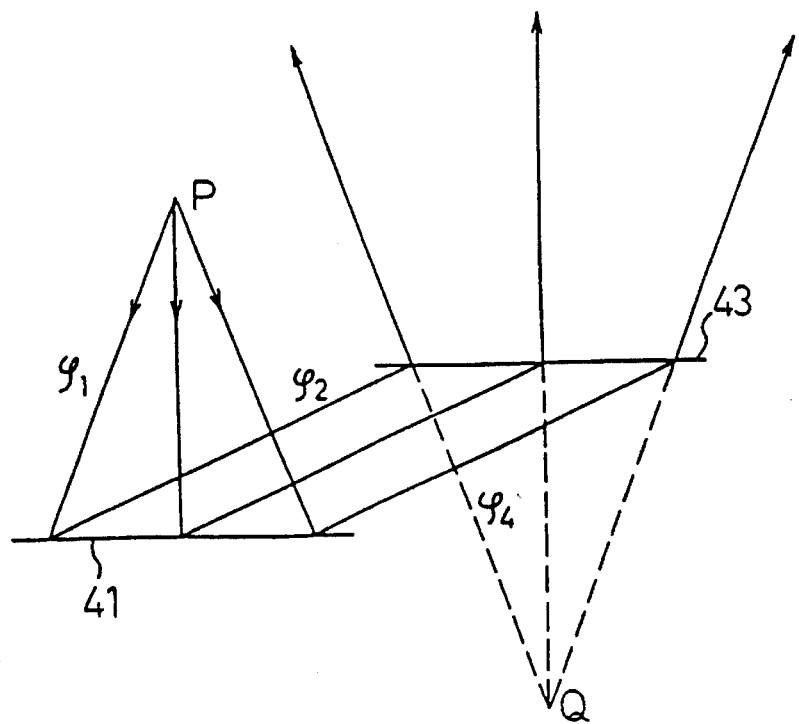

The embodiment of FIG. 12 is a hologram optical system employing a reflection type hologram 41 and a transmission type hologram 43.

Figure 3:
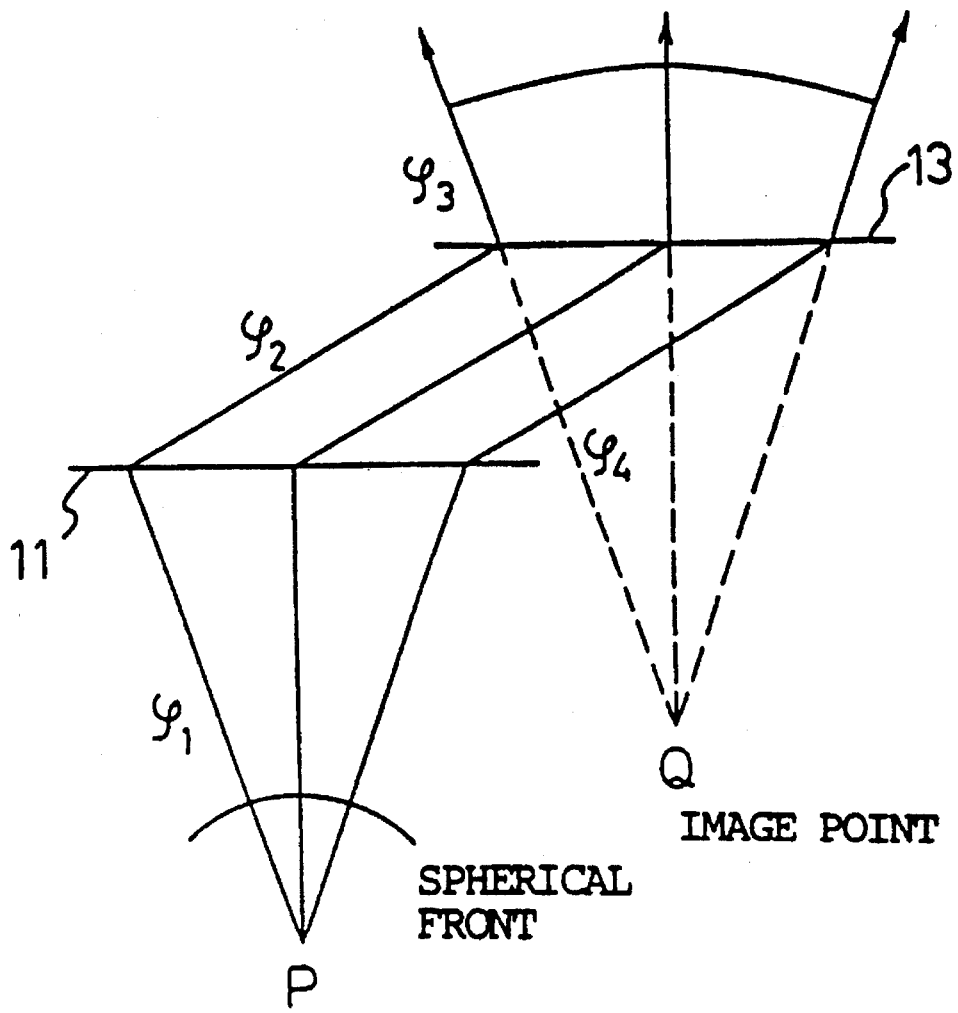
FIG. 3 is a diagram of a first embodiment of the present invention employing two transmission type holograms.

According to the embodiment in FIG. 3, the first and second holograms 11 and 13 are transmission type and are each formed by spherical waves and plane waves. The holograms are either a surface relief type or a volume type. Light from a light source P is diffracted by the first hologram 11 (an optical path length $\psi_1$) and by the second hologram 13 (an optical path length $\psi_2$), and provides a spherical wave with a point Q serving as a virtual light source with an optical path length $\psi_3$. As explained above, $\psi_1 + \psi_2 + \psi_3$ must be constant for any light beam. This means that a difference between $\psi_1 + \psi_2$ and $\psi_4$ must be constant because $\psi_3 + \psi_4$ is constant.

Figure 4:
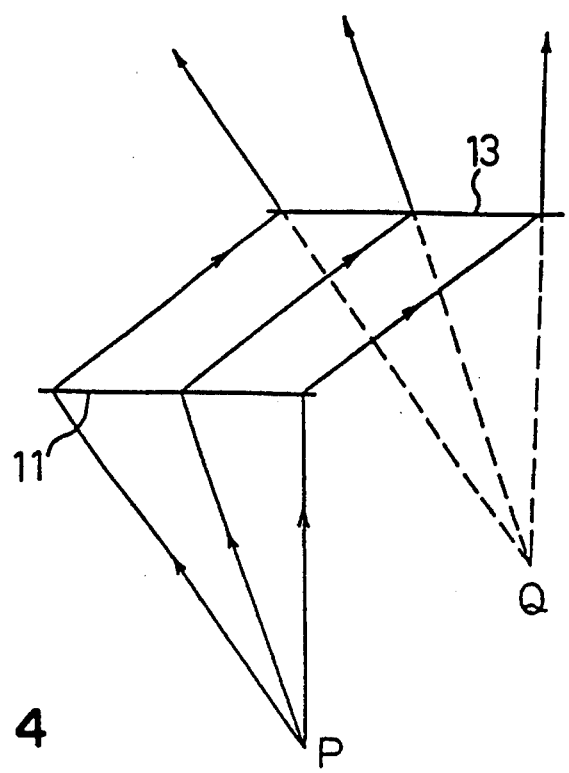
FIG. 4 is a diagram of a modification of FIG. 3.

As shown in the modification of FIG. 4, it is possible to arrange point light sources P and Q having optical axes inclined relative to the surfaces of first and second holograms 11 and 13.

Figure 5:
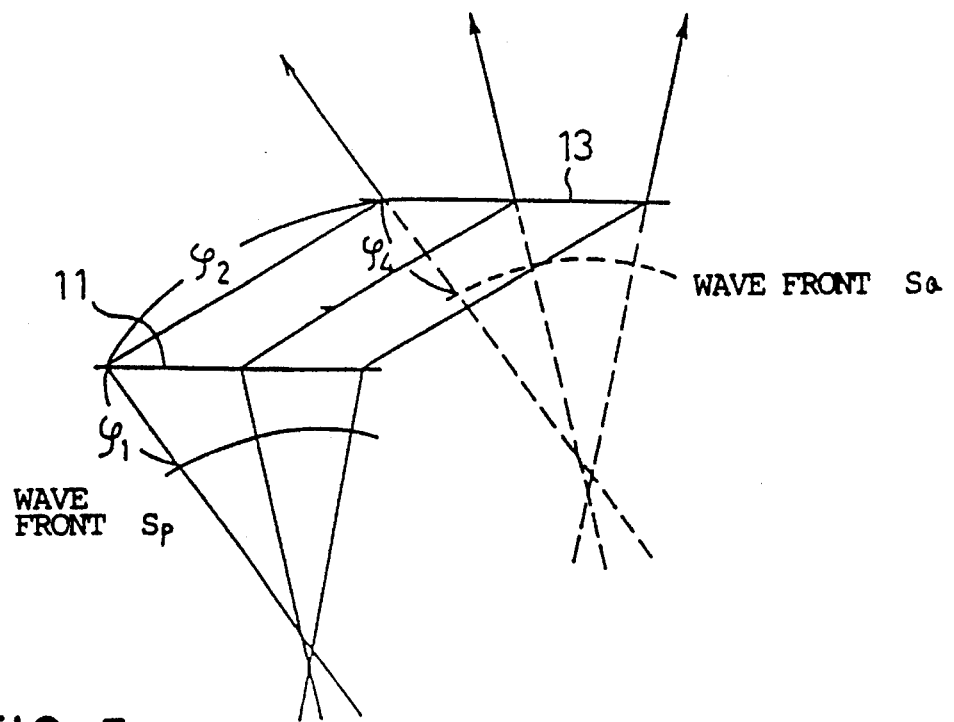
FIG. 5 is a diagram of a second embodiment of the present invention based on FIG. 4.

In the embodiment of FIG. 5, an incident wave front is not a spherical wave but an aspherical wave front, e.g., an elliptic wave front Sp. If a second hologram 13 handles the similar wave front, this embodiment is equivalent to the embodiment of FIG. 4.

Figure 6:
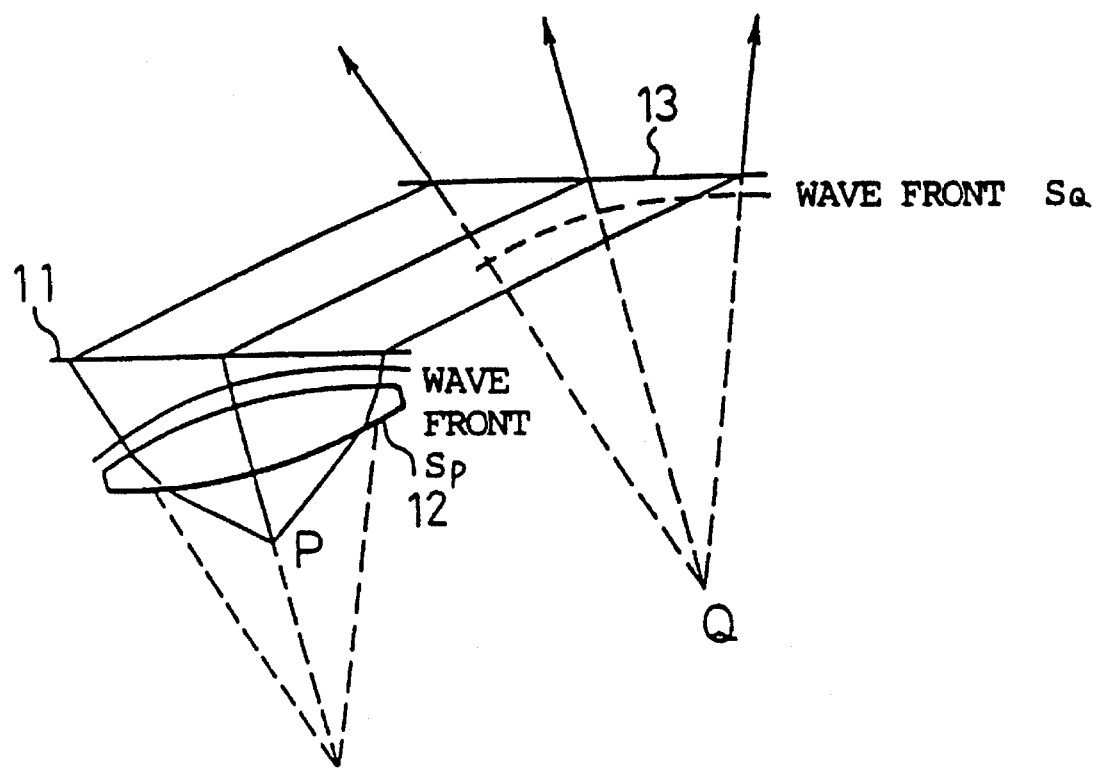
FIG. 6 is a diagram of a third embodiment according to the present invention.

According to the embodiment of FIG. 6, a lens 12 such as an optical glass lens or a Fresnel lens having a predetermined refractive index is inserted before a first hologram 11, thereby forming a required wave front. Similar to FIG. 5, a lens outgoing wave front Sp and a wave front Sq must be identical to each other.

Figure 7:
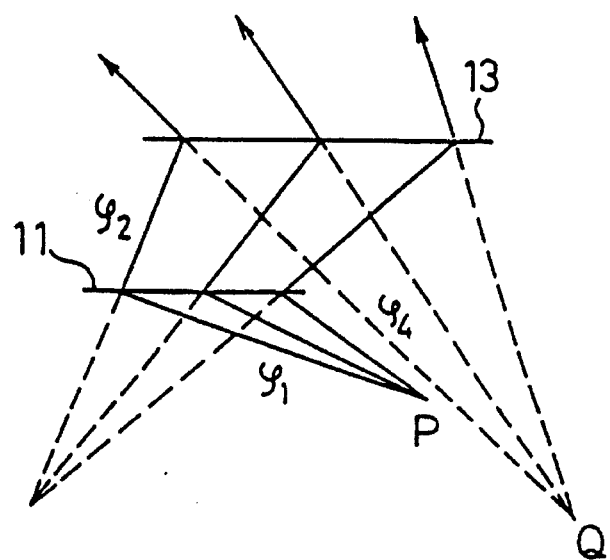
FIGS. 7 and 8 are diagrams of fourth and fifth embodiments, respectively according to the present invention.
Figure 8:
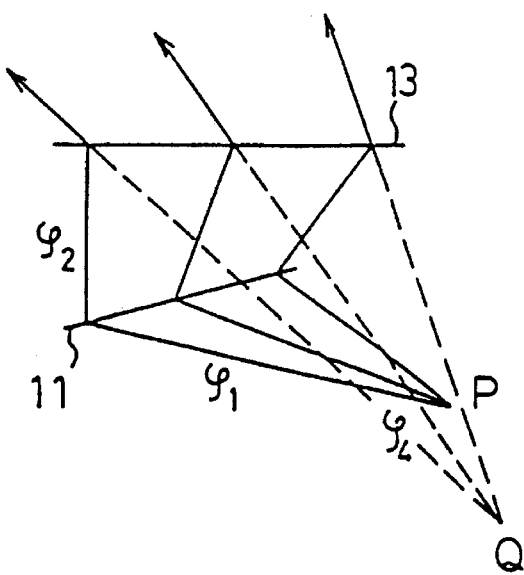

According to the embodiment of FIG. 7, holograms 11 and 13 are formed by spherical wave fronts. In this embodiment, $\psi_1 + \psi_2 - \psi_4 = C$ (constant). In FIG. 7, first and second hologram 11 and 13 are in parallel with each other. In FIG. 8 the first and second holograms are not in parallel with each other.

According to the embodiments shown in FIGS. 9 and 10, two reflection type holograms 21 and 23 are employed to convert divergent light into convergent light. FIG. 9 uses flat holograms, FIG. 10 uses holograms each having a curved shape. In each case, the length of an optical path from an object point P to a wave front where a virtual image point Q appears is constant, to provide a simple chromatic aberration correcting optical system. In particular, the latter embodiment is useful for a hologram optical system of a head-up display of an automobile, etc., because a front window of the automobile frequently has a curved shape. According to a more preferable example of the curved structure, first and second holograms are provided with opposite curvatures. In the embodiment of FIG. 10, a light beam is reflected and diffracted by the first hologram formed on a convex surface and by the hologram formed on a concave surface. This sort of combination can easily realize equidistant optical paths, and therefore, easily correct a chromatic aberration.

The embodiments of FIGS. 11 and 12 are hologram optical systems employing a transmission type hologram 31 and a reflection type hologram 33, and a reflection type hologram 41 and a transmission type hologram 43, respectively.

The above hologram optical systems are each based on the principle that the length of an optical path is constant.

The embodiments shown in FIGS. 13 to 16 will be explained. These embodiments are achromatic hologram optical systems each employing two flat holograms. To obtain an image enlarging system or an image reducing system having a small chromatic aberration with the two flat holograms, the length of an optical path from an object point P to an image point Q must be constant. Based on this principle, the two flat holograms form the following variations of an optical structure:

(1) A hologram optical structure having a first hologram $H_1$ for converting a divergent spherical wave into a divergent spherical wave, and a second hologram $H_2$ for converting the divergent spherical wave into a convergent spherical wave. (Divergent spherical wave→Divergent spherical wave→Convergent spherical wave);

(2) A hologram optical structure having a first hologram $H_1$ for converting a divergent spherical wave into a divergent spherical wave, and a second hologram $H_2$ for converting the divergent spherical wave into a divergent spherical wave. (Divergent spherical wave→ Divergent spherical wave→Divergent spherical wave)

(3) A hologram optical structure having a first hologram $H_1$ for converting a convergent spherical wave into a divergent spherical wave, and a second hologram $H_2$ for converting the divergent spherical wave into a divergent spherical wave. (Convergent spherical wave→Divergent spherical wave →Divergent spherical wave)

(4) A hologram optical structure having a first hologram for converting a divergent spherical wave into a convergent spherical wave, and a second hologram $H_2$ for converting the convergent spherical wave into a divergent spherical wave. (Divergent spherical wave→Convergent spherical wave→Divergent spherical wave)

The conversion variations of a wave front with two holograms are all covered by the above four kinds. Although there are simply $2^3=8$ variations, a mode of, for example, "convergent spherical wave→convergent spherical wave→ convergent spherical wave" is an inversion of the above (2), and therefore, is covered by the above mode of (2). Consequently, it is understood that a verification of the above four modes is sufficient.

First, the mode (1) will be explained with reference to FIG. 13. According to the optical system of FIG. 13, a divergent spherical wave is converted into a divergent spherical wave by the first hologram, and then into a convergent spherical wave by the second hologram.

The object point P emits a divergent spherical wave, which enters the first transmission type hologram at point A at an angle β and a distance $l_2$. This beam is converted into a divergent spherical wave having an outgoing angle δ with respect to the first hologram $H_1$. This beam becomes a divergent spherical wave having a virtual light source P' that is spaced away from the second hologram by a distance $l_3$, and enters the second hologram at a point A' at an incident angle (δ+τ), where τ is a cross angle formed between the first and second holograms. A distance on an optical axis from the first hologram to the second hologram is $l_4$. The beam diffracted by the second hologram $H_2$ is converted into a convergent spherical wave having an outgoing angle α and an image point Q that is spaced away from the second hologram by $l_1$.

Here, another optical path is set for a beam that comes out of the object point P and reaches the point Q through points B (instead of the point A) and B'.

According to the above mentioned principle, a chromatic aberration can be eliminated if the following relationships are established:

$$PA+AA'+A'Q=C=l_2+l_4+l_1 \qquad (21)$$

$$PB+BB'+B'Q=C \qquad (22)$$

Here, it is assumed that A'B'=a, and the equation (2) is developed for a to obtain the following equations:

$$\psi_3=B'Q=l_1Ra+Ua^2+ \ldots \ldots \qquad (23)$$

$$\psi_2=BB'=l_4+Sa+Va^2+ \ldots \ldots \qquad (24)$$

$$\psi_1=PB=l_2+Ta+Wa^2+ \ldots \ldots \qquad (25)$$

$$\psi_1+\psi_2+\psi_3=C+(R+S+T)a+(U+V+W)a^2+ \ldots \ldots =C \qquad (26)$$

If a is an infinitesimal term, the following equation is established for the first degree of a:

$$R+S+T=0 \qquad (27)$$

This equation represents chromatic aberration correction in connection with an optical axis change.

For the second degree of a, the following equation is established:

$$U+V+W=0 \qquad (28)$$

The equation represents chromatic aberration correction in connection with image forming conditions.

Here, R, S, T, U, V, and W are expressed as follows:

$$R=-\sin \alpha \qquad (29)$$

$$S=-\{(l_3-l_4)/l_3\} \cos (\gamma+\delta) \tan \delta+\sin (\gamma+\delta)=(l_4/l_3) \sin (\gamma+\delta)+\{(l_3-l_4)/l_3\} \sin \gamma/\cos \delta \qquad (30)$$

$$T=\{(l_3-l_4)/l_3\} \sin \beta \cos (\gamma+\delta)/\cos \delta \qquad (31)$$

$$U=\cos^2 \alpha/(2l_1) \qquad (32)$$

$$V=\{l_4/(2l_3^2)\} \cos^2 (\gamma+\delta)\{(l_3-l_4)/l_3^2\} \sin \gamma \sin \delta \cos (\gamma+\delta)/\cos^2 \delta \qquad (33)$$

$$W=-\{(l_3-l_4)/l_3^2\} \cos (\gamma+\delta)/\cos^2 \delta\{\sin \beta \sin \gamma-(l_3-l_4)/(2l_2) \cos^2 \beta \cos (\gamma+\delta)\} \qquad (34)$$

From the equations (27) and (29) to (31), it is satisfactory if the following equation is met in connection with the first order infinitesimal quantity of a:

$$\sin \alpha=-\{(l_3-l_4)/l_3\} \cos (\gamma+\delta) (\sin \delta-\sin \beta)/\cos \delta+\sin (\gamma+\delta) \qquad (35)$$

If γ is 0, the two holograms are in parallel with each other, and the equation (35) becomes as follows:

$$\sin \alpha=-(l_4/l_3) (\sin \beta-\sin \delta)+\sin \beta \qquad (36)$$

If γ is 90 degrees, the two holograms are orthogonal to each other, and the equation (35) becomes as follows:

$$\sin \alpha=-\{(l_3-l_4)/l_3\}( \sin \beta-\sin \delta)/\tan \delta+\cos \delta \qquad (37)$$

Further, if $l_3$ of the equation (35) is infinite, the first and second holograms are joined with a coherent wave, and the following relationship is established:

$$\sin \alpha=-\cos (\gamma+\delta) ( \sin \delta-\sin \beta)/\cos \delta+\sin (\gamma+\delta)=\sin \gamma/\cos \delta+\sin$$

$$\beta \cos(\gamma+\delta)/\cos\delta \quad (38)$$

If, in addition, the two holograms are in parallel with each other ($\gamma=0$), it will be $\sin\alpha=\sin\beta$.

Taking the second order infinitesimal term of a into account, the following equation is obtained for an image forming distance, according to the equations (28) and (32) to (34):

$$-\cos^2\alpha/(2l_1) = (l_4/l_3^2/2)\cos^2(\gamma+\delta) + \quad (39)$$

$$\{(l_3-l_4)/l_3^2\}\cos(\gamma+\delta)(\sin\delta-\sin\beta)\sin\gamma/\cos^2\delta +$$

$$\{(l_3-l_4)^2/l_2/l_3^2/2\}\cos^2\beta\cos^2(\delta+\gamma)/\cos^2\delta$$

Here, if $\gamma=0$, the two holograms are in parallel with each other, and the equation (39) becomes as follows:

$$-\cos^2\alpha/(2l_1)=(l_4/l_3^2/2)\cos^2\delta+\{(l_3-l_4)^2/l_2/l_3^2/2\}\cos^2\delta \quad (40)$$

Since the right side of the above equation is positive, this equation does not generally stand. This means that, if the two holograms are in parallel with each other, it is difficult to correct the chromatic aberration in connection with an image forming relationship.

If $\gamma$ is 90 degrees, the two holograms are orthogonal to each other, and the equation (39) becomes as follows:

$$-\cos^2\alpha/(2l_1) = (l_4/l_3^2/2)\sin^2\delta - \quad (41)$$

$$\{(l_3-l_4)/l_3^2\}\sin\delta(\sin\delta-\sin\beta)/\cos^2\delta +$$

$$\{(l_3-l_4)^2/l_2/l_3^2/2\}\cos^2\beta\sin^2\delta/\cos^2\delta$$

If $l_3$ is infinite in the equation (39), the first and second holograms are joined with a coherent wave, and the following equation is established:

$$l_2/l_1=-[\cos\beta\cdot\cos(\delta+\gamma)/\cos\alpha\cdot\cos\delta]^2 \quad (42)$$

Since $l_1$ and $l_2$ are both positive numerals, it is generally understood that an image forming relationship does not stand if the holograms are joined with a coherent wave.

From the above, when a hologram optical system satisfies both of the equations (35) and (39), a chromatic aberration of the system is very small. If the system satisfies only the equation (35), a minor chromatic aberration occurs but this is negligible in practical use. As mentioned before, the above results are applicable, by oppositely tracing a light beam, for an optical system having a first hologram for converting a divergent spherical wave into a convergent spherical wave and a second hologram for converting the convergent spherical wave into a convergent spherical wave.

Figure 13:
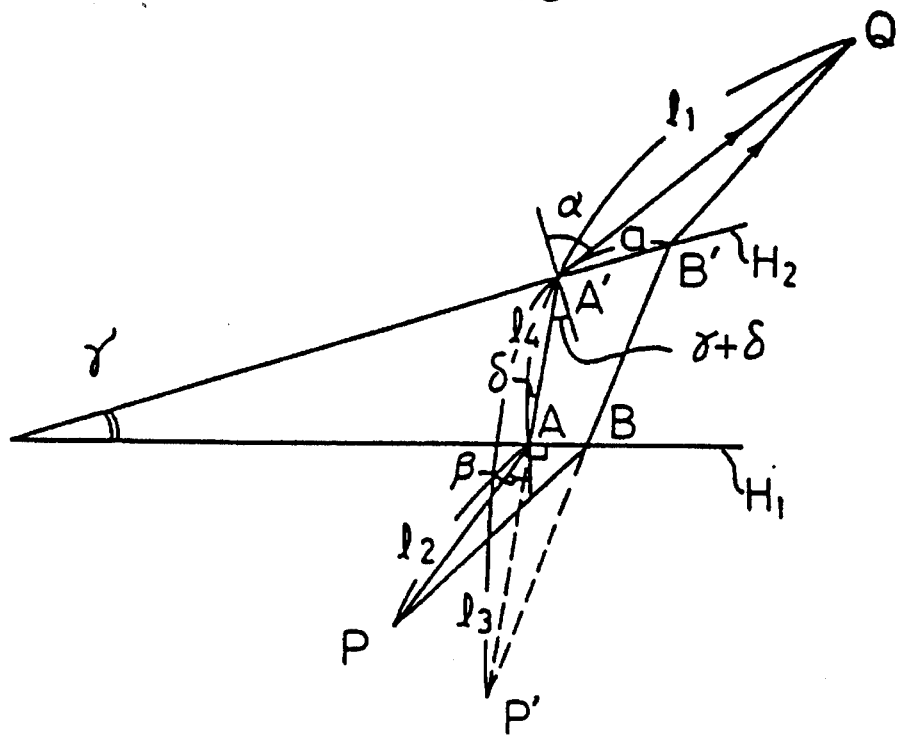
FIGS. 13 to 15 are diagrams of three modes of wave front conversion with two flat holograms.
Figure 14:
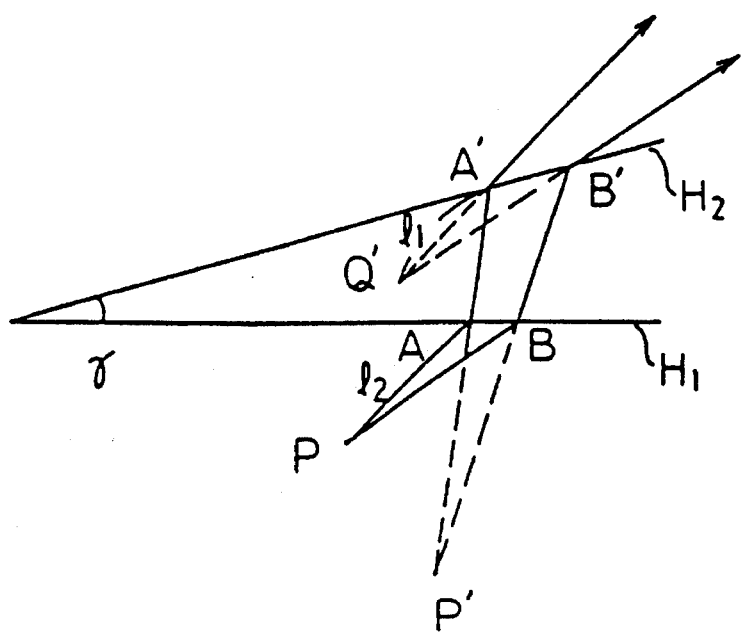

FIG. 14 shows the principle and arrangement of an optical system having a first hologram for converting a divergent spherical wave into a divergent spherical wave and a second hologram for converting the divergent spherical wave into a divergent spherical wave. The difference from the case of FIG. 13 is that the second hologram provides the divergent spherical wave. In this case, the equations (21) to (26) will be as follows, to realize an optical path of constant length:

$$PA+AA'-A'Q=C'=l_2+l_4-l_1$$

$$PB+BB'-B'Q=C'$$

$$\psi_3=B'Q=l_1-Ra+Ua^2+\ldots$$

$$\psi_2=BB'=l_4+Sa+Va^2+\ldots$$

$$\psi_1=PB=l_2+Ta+Wa^2+\ldots$$

$$\psi_1+\psi_2-\psi_3=C'+(R+S+T)a+(-U+V+W)a^2+\ldots=C'$$

Accordingly, a chromatic aberration correcting relationship is obtainable from the equations (29) to (34) and from the following:

$$R+S+T=0 \quad (43)$$

$$-U+V+W=0 \quad (44)$$

From the equation (43), a chromatic aberration correction expression for the first order infinitesimal quantity of a will have the same relationship as that for the equations (35) to (38).

On the other hand, an expression for image formation with the second order infinitesimal quantity of a is obtainable by converting the sign of $l_1$ into a negative sign in the equations (39) to (42).

$$\cos^2\alpha/2l_1 = (l_4/l_3^2/2)\cos^2(\delta+\gamma) + \quad (45)$$

$$\{(l_3-l_4)^2/l_2/l_3^2/2\}\cos^2\beta\cos^2(\delta+\gamma)/\cos^2\delta +$$

$$\{(l_3-l_4)/l_3^2\}\cos(\delta+\gamma)(\sin\delta-\sin\beta)\sin\gamma/\cos^2\delta$$

Here, if $\gamma$ is zero, the two holograms are in parallel with each other, and the equation (45) becomes as follows:

$$\cos^2\alpha/2l_1=(l_4/l_3^2/2)\cos^2\delta+\{(l_3-l_4)^2/l_2/l_3^2/2\}\cos^2\delta \quad (46)$$

If $\gamma$ is 90 degrees, the two holograms are orthogonal to each other, and the equation (45) becomes as follows:

$$\cos^2\alpha/2l_1 = (l_4/l_3^2/2)\sin^2\delta + \quad (47)$$

$$\{(l_3-l_4)^2/l_2/l_3^2/2\}\cos^2\beta\sin^2\delta/\cos^2\delta -$$

$$\{(l_3-l_4)/l_3^2\}\sin\delta(\sin\delta-\sin\beta)/\cos^2\delta$$

If $l_3$ is infinite in the equation (45), the first and second holograms are joined with a coherent wave, and the following relationship is established:

$$l_2/l_1=[\cos\beta\cdot\cos(\delta+\gamma)/\cos\alpha\cdot\cos\delta]^2 \quad (48)$$

From the above, if a hologram optical system is prepared to satisfy both the equations (35) and (45), a chromatic aberration of the system will be very small. If the hologram optical system satisfies only the equation (45), the system may cause a slight chromatic aberration which is negligible in practical use. The above results are applicable, by tracing a light beam oppositely, for an optical system having a first hologram for converting a convergent spherical wave into a convergent spherical wave and a second hologram for converting the convergent spherical wave into a convergent spherical wave.

Figure 15:
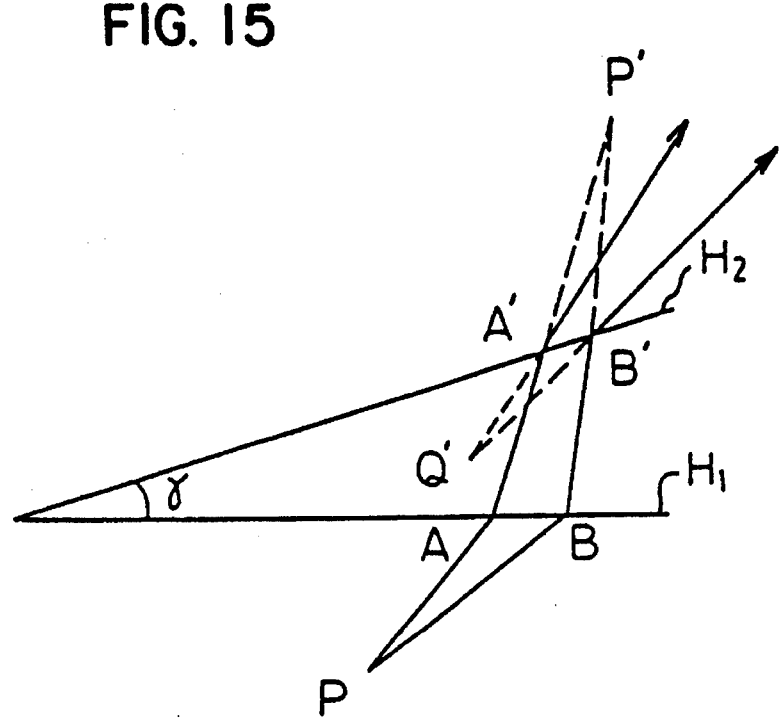

FIG. 15 shows the principle and arrangement of an optical system having a first hologram for converting a divergent spherical wave into a convergent spherical wave, and a second hologram for converting the convergent spherical wave into a divergent spherical wave. The difference from the case of FIG. 14 is that the first hologram provides the convergent spherical wave. In this case, the equations (21) to (26) will be as follows, to realize an optical path of constant length:

$$PA+AA'-A'Q=C'=l_2+l_4-l_1$$

$$PB+BB'-B'Q=C'$$

$$\psi_3=B'Q=l_1-Ra+Ua^2+\ldots$$

$$\psi_2=BB'=l_4+S'a+V'a^2+\ldots$$

$$\psi_1=PB=l_2+T'a+W'a^2+\ldots$$

$$\psi_1+\psi_2-\psi_3=C'+(R+S'+T)a+(-U+V'+W')a^2+\ldots=C'$$

Here, the newly introduced S', V', T', and W' will be as follows:

$$S'=-\{l_4/(l_3-l_4)\}\sin(\gamma+\delta)\gamma+\delta+\{l_3/(l_3 l_4)\}\sin\gamma/\cos\delta \quad (49)$$

$$T'=\{l_3/(l_3-l_4)\}\sin\beta\cos(\gamma+\delta)/\cos\delta \quad (50)$$

$$V'=\{l_4/(l_3-l_4)^2/2\}\cos^2(\gamma+\delta)-\{l_3/(l_3 31\ l_4)^2\}\sin\gamma\sin\delta\cos(\gamma+\delta)/\cos^2 67 \quad (51)$$

$$W'=-\{l_3/(l_3-l_4)^2\}\cos(\gamma+\delta)/\cos^2\delta\{\sin\beta\sin\gamma-l_3/(b\ 2l_2)\cos^2\beta\cos(\gamma+\delta)\} \quad (52)$$

A chromatic aberration correcting relation is obtainable from the above relationships and the following equations:

$$R + S' + T = 0 \quad (53)$$

$$-U + V' + W' = 0$$

$$\sin\alpha = \{l_3/(l_3 - l_4)\}\sin\beta\cos(\delta + \gamma)/\cos\delta +$$
$$\{l_3/(l_3 - l_4)\}\sin\gamma/\cos\delta - \{l_4/(l_3 - l_4)\}\sin(\delta + \gamma)$$

If $\gamma$ is zero, the two holograms are in parallel with each other, and the equation (53) becomes as follows:

$$\sin\alpha=\{l_3/(l_3-l_4)\}\sin\beta-\{l_4/(l_3-l_4)\}\sin\delta \quad (54)$$

If $\gamma$ is 90 degrees, the two holograms are orthogonal to each other, and the equation (53) becomes as follows:

$$\sin\alpha\cos\delta=-\{l_3/(l_3-l_4)\}\sin\beta\sin\delta+\{l_4/(l_3-l_4)\}\sin\delta \quad (55)$$

If $l_3$ in the equation (53) is infinite, the first and second holograms are joined with a coherent wave, and the same relationship as in the equation (38) is established.

$$\sin\alpha=\sin\gamma/\cos\delta+\sin\beta\cos(\gamma+\delta)/\cos\delta \quad (38')$$

On the other hand, taking the second degree infinitesimal term of a into account, the following equation is obtained for an image forming distance:

$$\cos^2\alpha/2l_1 = \{l_4/(l_3 - l_4)^2/2\}\cos^2(\delta + \gamma) + \quad (56)$$
$$\{l_3^2/(l_3 - l_4)^2/l_2/2\}\cos^2\beta\cos^2(\delta + \gamma)/\cos^2\delta -$$
$$\{l_3/(l_3 - l_4)^2\}\sin\gamma\cos(\delta + \gamma)(\sin\delta - \sin\beta)/\cos^2\delta$$

Here, if $\gamma$ is zero, the two holograms are in parallel with each other, and the equation (56) becomes as follows:

$$\cos^2\alpha/2l_1=\{l_4/(l_3-l_4)^2/2\}\cos^2\delta+\{l_3^2/(l_3-l_4)^2/l_2/2\}\cos^2\beta \quad (57)$$

If $\gamma$ is 90 degrees, the two holograms are orthogonal to each other, and the equation (56) becomes as follows:

$$\cos^2\alpha/2l_1=\{l_4/(l_3-l_4)^2/2\}\sin^2\delta+\{l_3^2/(i\ l_3-l_4)^2/l_2/2\}\cos^2\beta\sin^2\delta/\cos^2\delta \quad (58)$$

If $l_3$ is infinite in the equation (56), the first and second holograms are joined with a coherent wave, and the same relationship as in equation (48) will be established:

$$l_2/l_1=[\cos\beta\cdot\cos(\delta+\gamma)/\cos\alpha\cdot\cos\delta]^2 \quad (48')$$

From this, if a hologram optical system is prepared to satisfy both the equations (53) and (56), a chromatic aberration of the system will be very small. If the optical system satisfies only the equation (53), it causes a slight chromatic aberration which is negligible in practical use. The above results are applicable, by oppositely tracing a light beam, for an optical system having a first hologram for converting a convergent spherical wave into a divergent spherical wave, and a second hologram for converting the divergent spherical wave into a convergent spherical wave.

With reference to FIGS. 13 to 15, the chromatic aberration correcting optical structures using spherical waves have been explained. Table 1 collectively shows the chromatic aberration correcting equations of the four basic optical systems of the spherical wave conversion. As mentioned above, all spherical wave conversion systems can be handled according to these four basic systems.

TABLE 1

| | Various optical structures | | | |
|---|---|---|---|---|
| | Structure 1 (Mode 1) | Structure 2 (Mode 2) | Structure 3 (Mode 3) | Structure 4 (Mode 4) |
| | $\psi_3$ (Second hologram outgoing wave) | | | |
| | Convergent spherical wave | Divergent spherical wave | Divergent spherical wave | Divergent spherical wave |
| | $\psi_2$ (First hologram outgoing wave) | | | |
| | Divergent spherical wave | Divergent spherical wave | Convergent spherical wave | Divergent spherical wave |
| | $\psi_1$ (First hologram incident wave) | | | |
| | Divergent spherical wave | Divergent spherical wave | Divergent spherical wave | Convergent spherical wave |
| | Optical axis chromatic aberration correction equation (Primary term of "a") | | | |
| | R + S + T = 0 | R + S + T = 0 | R + S' + T' = 0 | R + S + T = 0 |
| | Image formation chromatic aberration correcting equation (Secondary term of "a") | | | |
| | U + V + W = 0 | −U + V + W = 0 | −U + V' + W' = 0 | −U + V − W = 0 |

Figure 16:
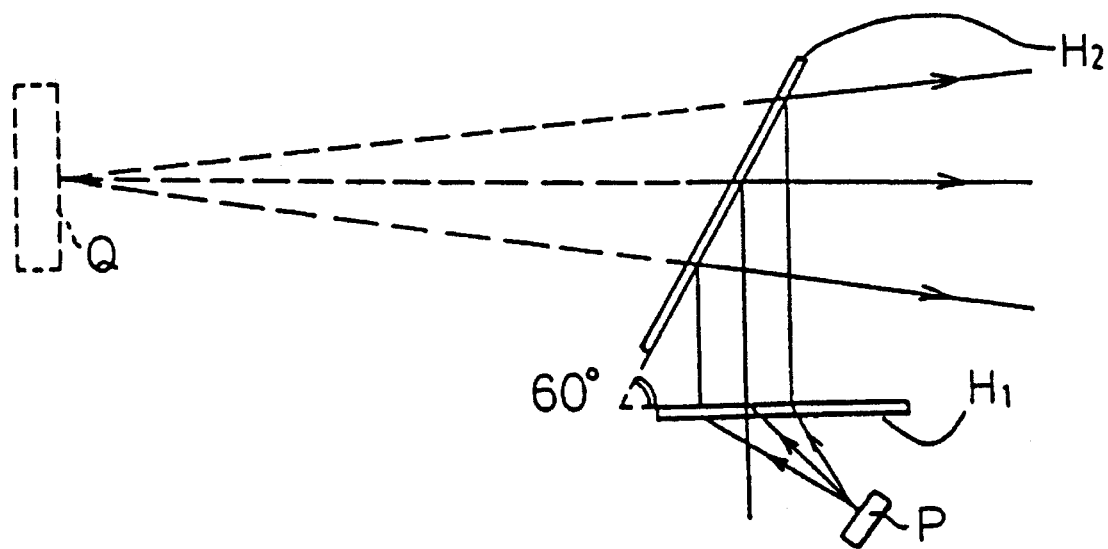
FIG. 16 is a diagram corresponding to FIGS. 13 to 15 but with reflection type holograms.

FIG. 16 shows an embodiment of a chromatic aberration correcting type image combiner employing a transmission type hologram and a reflection type hologram. This embodiment is realized when the second hologram $H_2$ of FIG. 14 is a reflection type. This embodiment is an example of an optical system that combines first and second holograms $H_1$ and $H_2$ with a divergent wave, and is realized by setting, in the equations (35) and (45), $\gamma$ to 60 degrees, $l_4/l_3$ to 0.2, $\delta$ to zero degrees, $\beta$ to minus 45 degrees, $\alpha$ to 35.7 degrees. When $l_3$ is 2000 mm and $l_1$ 200 mm, $l_2$ will be 985 mm. Based on this, the holograms are prepared as follows:

The first hologram $H_1$ is a transmission type hologram. A dry plate of silver salt for a cubic type hologram is prepared. An argon laser having a wavelength of 514.5 nm irradiates the dry plate with a spherical wave at a distance 200 mm from the dry plate at an incident angle of 45 degrees, as well as with a spherical wave at a distance of 1600 nm at right angles, thereby interference-exposing the dry plate. Thereafter, the dry plate is subjected to a development process. The second hologram $H_2$ is a reflection type hologram. A dry plate is irradiated with a spherical wave at a distance of 886 mm from the dry plate at an incident angle of 35.7 degrees and with a spherical wave at a distance of 2000 mm from the reverse side of the dry plate at an incident angle of 60 degrees, thereby interference-exposing the dry plate. Thereafter, the dry plate is subjected to a development process.

To form a hologram regenerating optical system, the first and second holograms $H_1$ and $H_2$ are arranged to form a cross angle of 60 degrees ($\gamma$=60 degrees). With respect to the first hologram, an optical axis has a distance of 200 mm and an angle of 45 degrees. As a light source P, a fluorescent display tube having a wavelength peak of 514 nm is employed. It has been confirmed that this system can form a clear enlarged virtual image with no chromatic aberration at a distance of 985 mm from the second hologram. Since this optical system is off-axis, no reflection is made by the second hologram, and an enlarged virtual image is formed at a distance location. Since a joined wave front of the first and second holograms is a spherical wave, the optical system is smaller than a conventional system. Since the holograms have the large cross angle of 60 degrees, the second hologram can be set at an easily visible place when the first hologram is horizontally arranged.

The present invention can eliminate a chromatic aberration from a hologram optical system such as a head-up display (a point light source P being an indicator for emitting information light) employing incoherent light. Unlike conventional techniques that have difficulty in correcting the chromatic aberration of the off-axis type hologram, the present invention can easily correct the same. In addition, the present invention easily provides an optical system that provides an enlarged image at a distant location. Since the hologram is made from simple waves, i.e., spherical waves, it is easy to prepare such a hologram, and by changing a joint wave front from a divergent wave to a convergent wave, a reduction optical system can easily be obtained.

Although the explanation has been given for the achromatic system employing two off-axis hologram, the present invention is applicable to a system employing more than three holograms, as mentioned before.

With reference to FIGS. 17 to 21, a system employing more than three holograms, particularly off-axis type holograms, will be studied. By increasing the number of holograms, it is possible to achieve a greater aberration correction and improve the freedom of the hologram structure.

With reference to FIG. 2, it has been explained that a chromatic aberration correcting optical system is obtainable according to a hologram structure (referred to as the optical system A) in which a sum ($\psi_1+\psi_2+\psi_3$) of the lengths of optical paths from an incident wave front Sp to an outgoing wave front Sq is equal to a constant value $C_1$.

Figure 17:
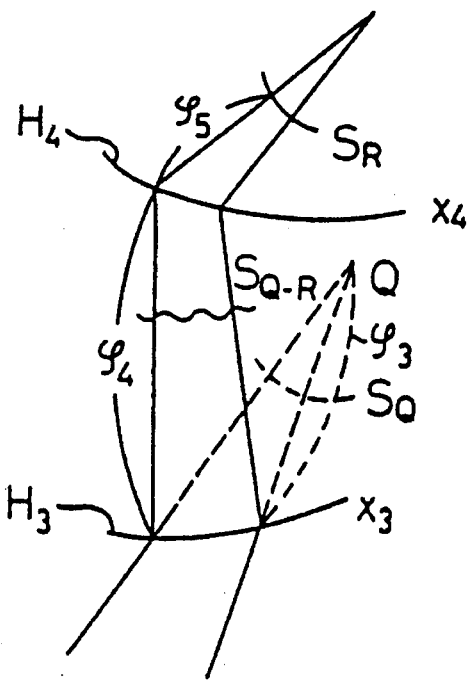
FIGS. 17 to 19 are diagrams of a principle of the present invention employing more than three holograms.
Figure 18:
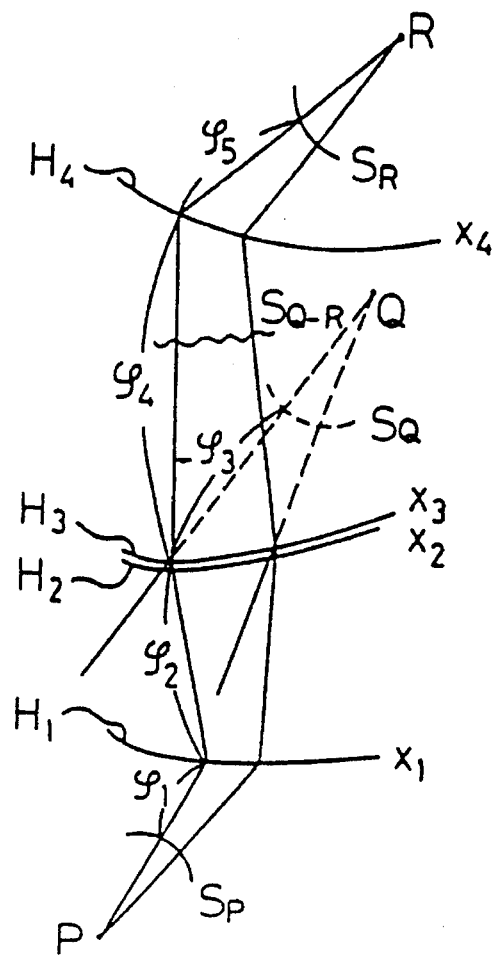

In FIG. 17, an achromatic optical system B that is different from the one shown in FIG. 2 comprises a third hologram $H_3$ having the same shape as that of the second hologram $H_2$ of FIG. 2, and a new fourth hologram $H_4$. An incident wave front to the third hologram $H_3$ is the same as the outgoing wave front Sq from the second hologram $H_2$ of FIG. 2. This optical system B will be considered. In this optical system B, a sum ($-\psi_3+\psi_4+\psi_5$) of the lengths of optical paths is equal to a constant value $C_2$.

The optical systems A and B are joined together with the second and third holograms $H_2$ and $H_3$ serving in common. This provides a combined hologram optical system shown in FIG. 18 comprising the four holograms $H_1$, $H_2$, $H_3$, and $H_4$. Since the optical systems A and B are each an achromatic optical system, the combined system is also an achromatic optical system. In this combined system, a sum ($\psi_1+\psi_2+\psi_3+\psi_4+\psi_5$)=($C_1+C_2$) of the lengths of optical paths is constant.

In this combined system, it is understood that "the length of an optical path in an achromatic hologram optical system is constant."

Figure 19:
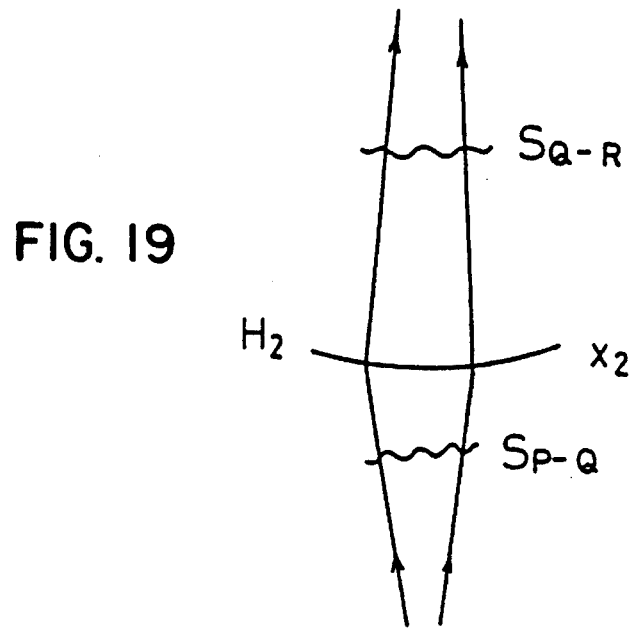

As shown in FIG. 19, the second hologram $H_2$ and third hologram $H_3$ laid one upon another are equivalently replaceable with a fifth hologram $H_5$ that is different from the second and third holograms. The fifth hologram $H_5$ has an incident wave front that is an outgoing wave front $S_{p-q}$ from the first hologram $H_1$, and an outgoing wave front that is an outgoing wave front $S_{q-r}$ from the third hologram $H_3$. Accordingly, the combined hologram optical system made of the optical systems A and B is replaceable with a hologram optical system made of the three holograms.

Generally, the number of combinations of two sets of achromatic hologram optical systems having common hologram shapes and wave fronts is infinite. Namely, by increasing the number of holograms, it is possible to increase the freedom of design.

On the other hand, an optical system having more than three holograms with a sum of the lengths of optical paths being constant can be divided into two sets of hologram optical systems having common wave fronts. Generally, it is possible to make the length of an optical path of each of the divided hologram optical systems constant. Accordingly, the optical system having more than three holograms establishes that "it is an achromatic optical system if a sum of the lengths of optical paths is constant."

From the above, it is verified in the combined optical system that "it is an achromatic hologram optical system if a sum of the lengths of optical paths from an incident wave front to an outgoing wave front is constant, and the opposite is also true."

Figure 20:
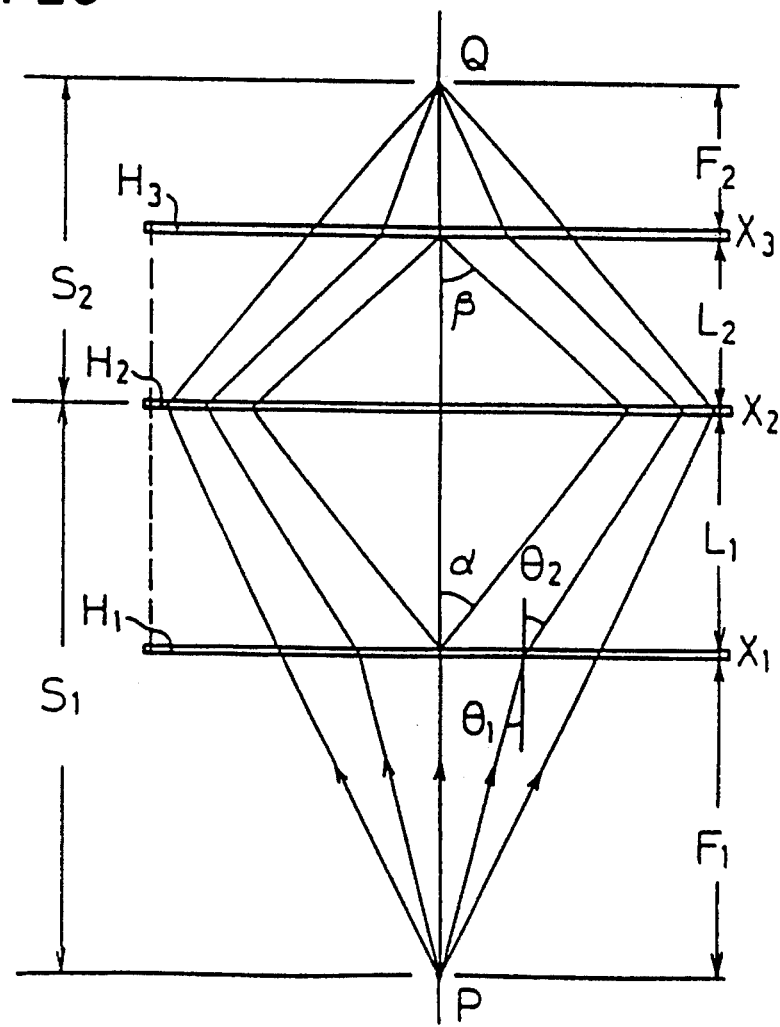
FIG. 20 is a diagram of a concrete structure employing three holograms.

FIG. 20 shows an embodiment of an achromatic hologram optical system employing three holograms for converting a divergent spherical wave into a convergent spherical wave. A divergent spherical wave from a point light source P is converted into a predetermined convergent wave front by a first hologram $H_1$, into a predetermined divergent wave front by a second hologram $H_2$, and finally, into a convergent spherical wave by a third hologram $H_3$. All optical paths from the divergent light source point P to a convergent light source point Q are set to be equal to one another.

An example of the hologram optical system for converting a divergent spherical wave into a convergent spherical wave is disclosed in, for example, Japanese Unexamined Patent Publication No. 63-155432, which is an axes crossing hologram optical system. Another example is disclosed in Optics Communication 58385 (1986), which is an optical system for cutting off part of the light flux. Each of these examples employs two holograms. The former has a drawback in that a light intensity distribution is deviated from a Gaussian distribution due to the cross-axes structure, and thus causes little contraction of a beam. The latter has a drawback in that the light usage efficiency is poor because the central part of the light flux is not used. On the other hand, the structure of the present invention basically achieves a Gaussian type intensity distribution and high light usage efficiency.

In the embodiment of FIG. 20, the lengths of optical paths from the point P to the point Q are equal to one another. This system is characterized in that a distance $l_A$ from the point P to the second hologram $H_2$ and a distance $l_B$ from the second hologram $H_2$ to the point Q are each constant in this case, the length of an optical path from the point P to the point Q is ($l_A+l_B$) which is constant. A zone $S_1$ from the point P to the second hologram $H_2$ and a zone $S_2$ from the second hologram $H_2$ to the point Q are separately considered, and combined thereafter.

The length $l_A$ of the optical path from the point P to the second hologram $H_2$ is expressed as follows:

$$l_A = F_1/\cos\theta_1 + L_1/\cos\theta_2 = F_1 + L_1/\cos\alpha$$

where $F_1$ is a distance from the point P to the first hologram $H_1$, $L_1$ a distance from the first hologram $H_1$ to the second hologram $H_2$, $\theta_2$ an incident angle at the first hologram $H_1$, $\theta_2$ an outgoing angle at the first hologram $H_1$, and $\alpha$ an outgoing angle at a center axis position of the first hologram $H_1$. According to the above equation, a relation between $\theta_1$ and $\theta_2$ will be given by specifying $\alpha$, $F_1$, and $L_1$. Since a spatial frequency $f_1$ of the first hologram $H_1$ times $\lambda$ (regeneration wavelength) is equal to (sin $\theta_1$+sin $\theta_2$), the spatial frequency $f_1$ is given as a function of the $\theta_1$.

When the first hologram plane is placed on a coordinate $x_1$, the spatial frequency $f_1$ of the first hologram is represented as a function of $x_1$ because ($F_1$ tan $\theta_1$=$x_1$). When the second hologram plane is placed on a coordinate $x_2$, a spatial frequency $f_2$ of the second hologram is given as an implicit function of $x_2$ according to the following equation:

$$x_2 = x_1 + L_1 \tan \theta_2$$

From the above, the hologram optical system in the zone $S_1$ can be defined. The hologram optical system of the zone $S_2$ also can be defined by using parameters such as $\beta$, $F_2$, and $L_2$.

Figure 21:
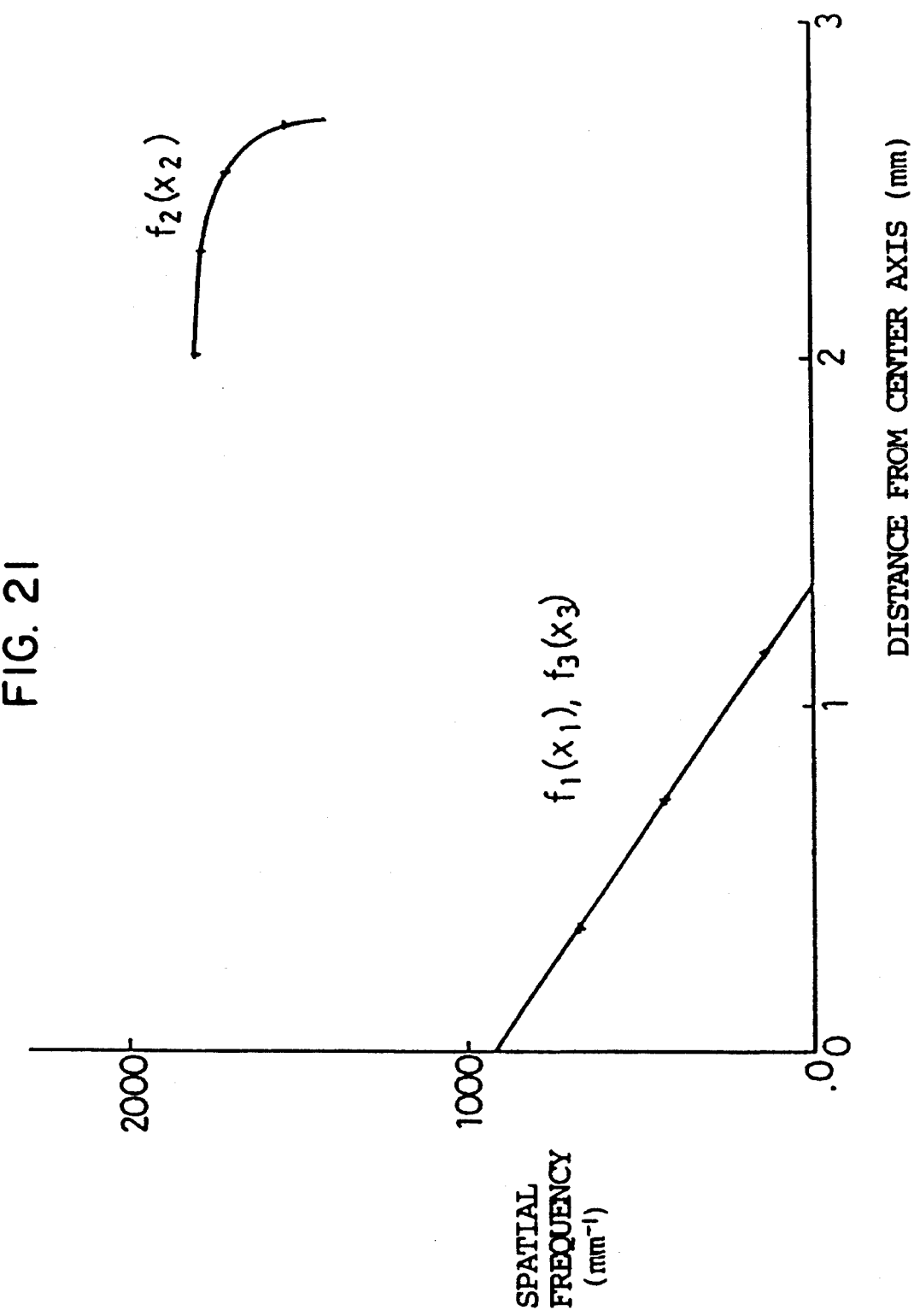
FIG. 21 is a diagram of spatial frequency distributions of the holograms shown in the embodiment of FIG. 20.

FIG. 21 shows spatial frequency distributions $f_1(x_1)$, $f_3(x_3)$, and $f_2(x_2)$ of an optical system having zones $S_1$ and $S_2$ of the same structure, with a semiconductor laser having a wavelength of 780 nm disposed at the point P to provide convergent light at the point Q with $L_1$, $F_1$, and $\alpha$ being 2 mm, 2 mm, and 45 degrees, respectively. In first and third holograms, the spatial frequency distributions decrease substantially linearly and become zero at $x_1$=1.35 mm. The distributions are opposite to those of a Fresnel type zone plate. On the other hand, a second hologram substantially has a constant spatial frequency distribution but is slightly decreased in a radial direction.

According to this structure, the maximum number of openings (NA=sin $\theta_M$) is limited by the following equation depending on $\alpha$:

$$\cos \theta_M = (h+1) \cos \alpha / (1+h \cos \alpha)$$

$$h = F_1 / L_1$$

Table 2 shows minimum values of $\alpha$ necessary for obtaining the required number of openings with h being 0.5, 1.0, and 2.0.

TABLE 2

| $\alpha$ (°) | h = 0.5 | h = 1.0 | h = 2.0 |
|---|---|---|---|
| 10 | 0.142 | 0.123 | 0.101 |
| 20 | 0.284 | 0.247 | 0.204 |
| 30 | 0.422 | 0.372 | 0.309 |
| 40 | 0.566 | 0.498 | 0.420 |
| 50 | 0.683 | 0.623 | 0.537 |
| 60 | 0.8 | 0.745 | 0.661 |
| 70 | 0.899 | 0.860 | 0.793 |

Maximum NA according to $\alpha$ (for the parameter h)

Figure 22:
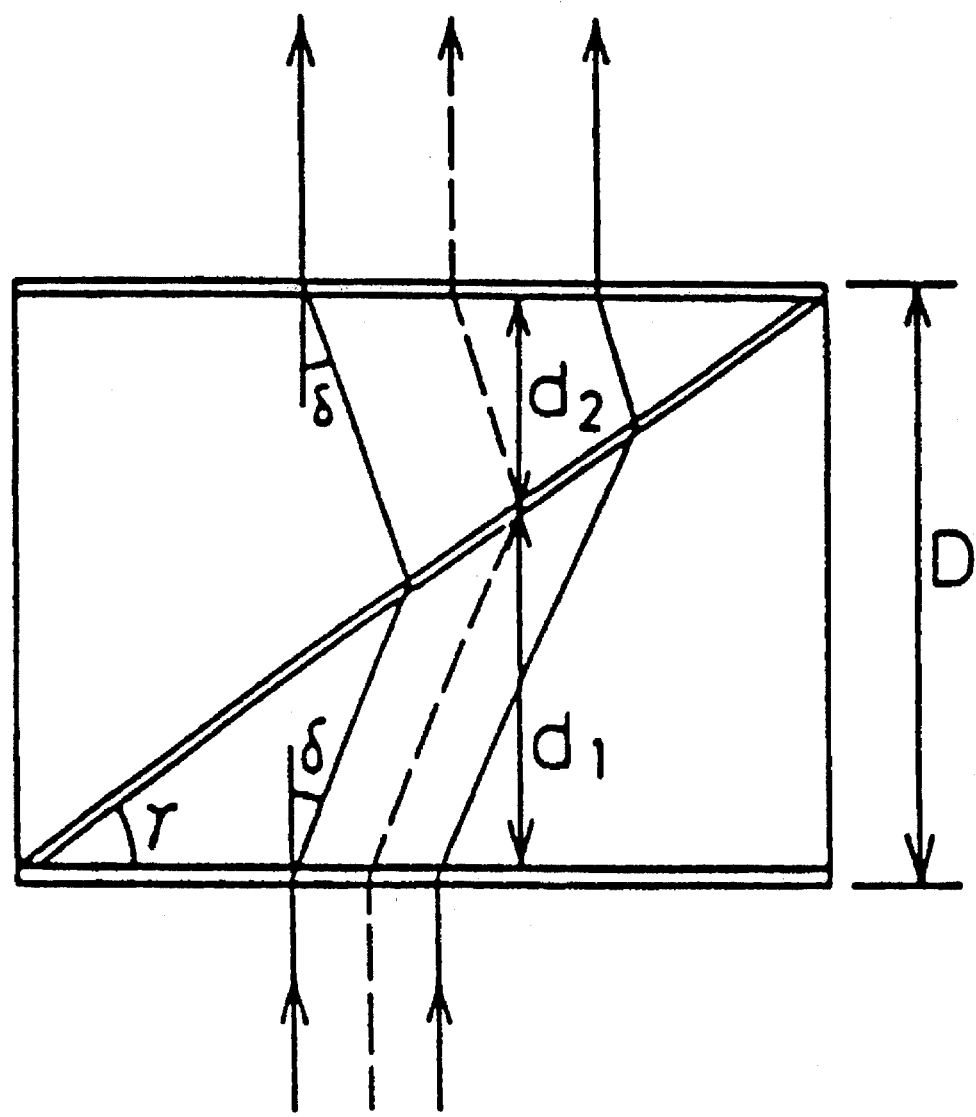
FIG. 22 is a diagram of a beam shaping optical system according to an embodiment of the present invention.
Figure 23:
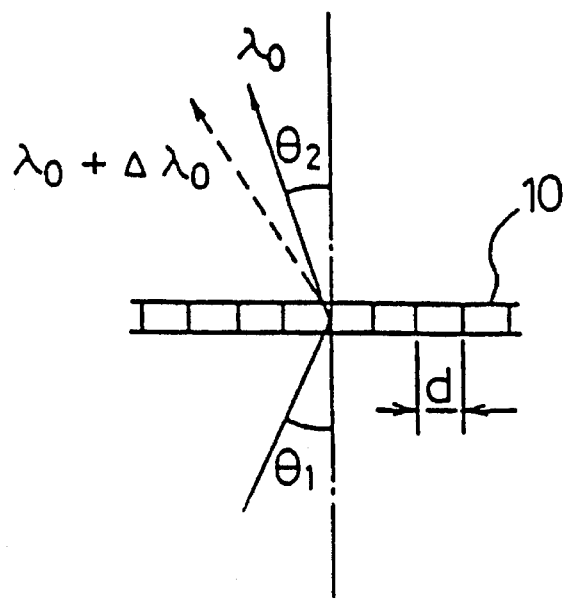
FIG. 23 is a diagram explaining a diffraction principle of a prior art single hologram.
Figure 24:
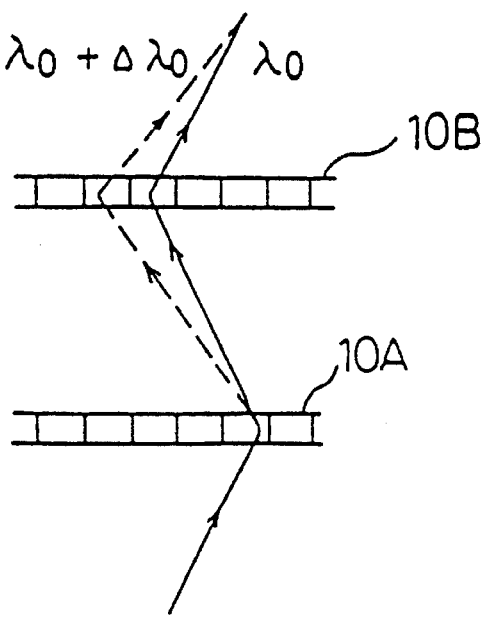
FIG. 24 is a diagram explaining a diffraction principle of two prior art holograms.

FIG. 22 shows an embodiment of a beam shaping optical system employing more than three holograms. A plane wave having a wave front $S_p$ is sequentially diffracted by a first hologram $H_1$, a second hologram $H_2$, and a third hologram $H_3$, thereby being converted into a plane wave having a wave front $S_Q$. Here, the holograms are so set that the length of an optical path from the wave front $S_p$ to the wave front $S_Q$ is constant. This arrangement provides an optical system that enlarges or reduces the diameter of a beam.

A well-known conventional system for enlarging or reducing the size of a beam is an anamorphic optical system. This employs two prisms for shaping a beam, and has a problem in that the total size of the optical system becomes large because the prisms are spatially arranged. In addition, it has a problem in that an incident beam and an outgoing beam will not be in parallel with each other if the prisms are not accurately arranged.

The optical system of FIG. 22 is small, and the parallelism of an incident beam and an outgoing beam is secured. In addition, the axis of an outgoing beam can be shifted in parallel with the axis of an incident beam, and thus this is applicable for adjusting an optical axis of an optical apparatus.

The preferred embodiment of FIG. 22 will be explained. According to the constant optical path rule, a plane wave that vertically irradiates the first hologram is diffracted by the same to the right at an angle $\delta$. This wave is diffracted to the left at an angle $2\delta$ by the second hologram that is inclined by an angle of $\gamma$ with respect to the surface of a base plate. Thereafter, the wave is diffracted by the third hologram to the right at an angle $\delta$, and exits in a direction orthogonal to the surface of the base plate. When a distance from the incident plane to the outgoing plane is D and a refractive index of a medium is N, the length of an optical path in the medium is ND/ cos $\delta$ which is constant. Here, $\delta$ and $\gamma$ determine an enlargement ratio or a reduction ratio of the diameter of a beam. Table 3 shows beam diameter enlargement ratios where $\delta$ and $\gamma$ are 30 degrees. If a beam is made incident oppositely incident i.e., if a beam is made incident from the outgoing plane, the diameter of the beam is naturally reduced. It will be naturally understood that a larger enlargement ratio is obtainable by laying the structures of FIG. 22 one upon the other. Namely, if the structure is rotated by 90 degrees around an axis of incident light and laid upon another, it is possible to adjust the enlargement or reduction.

When a distance from a position where an optical axis of a beam crosses the second hologram to the incident plane is $d_1$ and a distance from the same position to the outgoing plane is $d_2$, an incident optical axis coincides with an outgoing optical axis when $d_1$ is equal to $d_2$. In other words, if the structure is shifted in a direction vertical to the beam to adjust $d_1$ and $d_2$, the optical axes can be shifted while maintaining the parallelism of the incident and outgoing beams. Generally in many apparatuses, an optical axis of an incident beam is usually deviated from a predetermined position for certain reasons. The structure of the present invention has an advantage in that a predetermined outgoing optical axis can be maintained through such an adjustment. By using this structure with a structure obtained by turning this structure by 90 degrees, it is possible to shift an optical axis to an optional position.

TABLE 3

| ($\gamma$ = 30° degrees) | | | |
|---|---|---|---|
| $\delta$ | Enlargement ratio | $\delta$ | Enlargement ratio |
| 20° | 1.53 | 35° | 2.35 |
| 30° | 2.00 | 40° | 2.88 |

According to the present invention, an optical structure employing more than two holograms to keep a constant length of optical path between a wave front A and a wave front B can provide an optical system causing no chromatic aberration. The effect of the invention is first that the employment of two holograms each having curved surface shape provides an enlarging optical system with chromatic aberration corrected. This system is applicable for a front shield of an automobile. Second, the two flat holograms may be arranged to be not in parallel with each other, and joined with a divergent wave or a convergent wave. This system is applicable for a virtual image projector or a head-up display that is compact and can form an image at a distant location compared with a conventional system. In particular, if the holograms are arranged in accordance with predetermined equations, an apparatus having a remarkably small chromatic aberration can be provided. Third, three holograms may be arranged to form optical paths of an equal length and provide a chromatic aberration correcting optical system for converting a point light source into a point image. This optical system has an excellent light usage efficiency and beam convergence compared with conventional systems. Fourth, the three holograms may be arranged to form optical paths of an equal length and provide a beam diameter changing optical system, which has no chromatic aberration and in which a beam incident direction and a beam outgoing direction coincide with each other or are in parallel with each other. In this arrangement, the accuracy when arranging the optical system need not be so high compared with conventional beam diameter changing optical systems, and therefore, the size of the system can be made more compact.

Each of the optical structures according to the present invention is based on an optical system that is formed according to the rule that the lengths of optical paths must be equal to one another. This invention is applicable to various optical apparatuses that follow the rule. For example, the invention is applicable to video projectors, head-up displays for automobiles and airplanes, optical disk heads, laser printer scanners, POS scanners, and beam shaping optical systems.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to as falling within the scope of the invention in the appended claims and their equivalents.

We claim:

1. An achromatic hologram optical system, comprising:

two holograms in an achromatic system for convening a wave front A into a wave front B, the length of an optical path from an equiphase front of the wave front A to an equiphase front of the wave from B is constant, the optical path length defined by (physical length from the wave from A and wave from B)×(total refractive index), the wave from being a curved or plane surface normal to an outgoing direction of light, and each of said two holograms has a curved surface shape, said two holograms are inclined by $\gamma$ with respect to each other, a first one of said two holograms converts a divergent spherical wave in another divergent spherical wave, a second one of said two holograms converts a divergent spherical wave into another divergent spherical wave, and the following relationships are established:

$R+S+T=0$ $R=-\sin \alpha$ $S=-\{(l_3-l_4)/l_3\} \cos(\gamma+\delta) \tan \delta + \sin(\gamma+\delta) = (l_4/l_3) \sin(\gamma+\delta) + \{(l_3-l_4)/l_3\} \sin \gamma / \cos \delta$ $T=\{(l_3-l_4)/l_3\} \sin \beta \cos(\gamma+\delta)/\cos \delta$ where $\beta$ is an angle of an incident optical axis to said first hologram, $\delta$ is an angle of an outgoing optical axis from said first hologram, $\alpha$ is an angle of an outgoing optical axis from said second hologram, $l_4$ is a distance on an optical axis from said first hologram to said second hologram, and $l_3$ is a distance from a light source of the spherical wave that enters said second hologram to said second hologram.

2. A hologram optical system as set forth in claim 1, further satisfying the following relationships:

$-U+V+W=0$ $U=\cos^2 \alpha/(2l_1)$ $V=\{(l_4/(2l_3^2))\} \cos^2(\gamma+\delta)\{(l_3-l_4)/l_3^2\} \sin \gamma \sin \delta \cos(\gamma+\delta)/\cos^2 \delta$ $W=-\{(l_3-l_4)/l_3^2\} \cos(\gamma+\delta)/\cos^2 \delta \{\sin \beta \sin \gamma - (l_3-l_4)/(2l_2) \cos^2 \beta \cos(\gamma+\delta)\}$ where $l_2$ is a distance on an optical axis from a light point of the divergent spherical wave that enters said first hologram to said first hologram, and $l_1$ is a distance on an optical axis from a light point of the divergent spherical wave that exits said second hologram to said second hologram.

3. An achromatic hologram optical system comprising:

two holograms in an achromatic system for converting a wave front A into a wave front B, the length of an optical path from an equiphase front of the wave front A to an equiphase front of the wave front B is constant, the optical path length defined by (physical length from the wave front A and the wave front B)×(total refractive index), the wave front being a curved or plane surface normal to an outgoing direction of light, and a wave from a first one of said two holograms to a second one of said two holograms is a divergent wave or a convergent wave, said two holograms are inclined by $\gamma$ with respect to each other, a first one of said two holograms converts a divergent spherical wave into another divergent spherical wave, a second one of said two holograms converts a divergent spherical wave into another divergent spherical wave, and the following relationships are established:

$R+S+T=0$ $R=-\sin \alpha$ $S=-\{(l_3-l_4)/l_3\} \cos(\gamma+\delta) \tan \delta + \sin(\gamma+\delta) = (l_4/l_3) \sin(\gamma+\delta) + \{(l_3-l_4)/l_3\} \sin \gamma / \cos \delta$ $T=\{(l_3-l_4)/l_3\} \sin \beta \cos(\gamma+\delta)/\cos \delta$ where $\beta$ is an angle of an incident optical axis to said first hologram, $\delta$ is an angle of an outgoing optical axis from said first hologram, $\alpha$ is an angle of an outgoing optical axis from said second hologram, $l_4$ is a distance on an optical axis from said first hologram to said second hologram, and $l_3$ is a distance from a light source of the spherical wave that enters said second hologram to said second hologram.

4. A hologram optical system as set forth in claim 3, further satisfying the following relationships:

$-U+V+W=0$ $U=\cos^2 \alpha/(2l_1)$ $V=\{(l_4/(2l_3^2))\} \cos^2(\gamma+\delta)\{(l_3-l_4)/l_3^2\} \sin \gamma \sin \delta \cos(\gamma+\delta)/\cos^2 \delta$ $W=-\{(l_3-l_4)/l_3^2\} \cos(\gamma+\delta)/\cos^2 \delta \{\sin \beta \sin \delta - (l_3-l_4)/(2l_2) \cos^2 \beta \cos(\gamma+\delta)\}$ where $l_2$ is a distance on an optical axis from a light point of the divergent spherical wave that enters said first hologram to said first hologram, and $l_1$ is a distance on an optical axis from a light point of the divergent spherical wave that exits said second hologram to said second hologram.

5. An achromatic hologram optical system, comprising:
two holograms for converting a wave front A into a wave front B, the length of an optical path from an equiphase front of the wave front A to an equiphase front of the wave front B is constant, and each of said two holograms has a curved surface shape, said two holograms are inclined by $\gamma$ with respect to each other, a first one of said two holograms converts a divergent spherical wave into another divergent spherical wave, a second one of said two holograms converts a divergent spherical wave into another divergent spherical wave, and the following relationships are established:

$R+S+T=0$ $R=-\sin \alpha$ $S=-\{(l_3-l_4)/l_3\} \cos (\gamma+\delta) \tan \delta+\sin (\gamma+\delta)=(l_4/l_3) \sin (\gamma+\delta)+\{(l_3-l_4)/l_3\} \sin \gamma/\cos \delta$ $T=\{(l_3-l_4)/l_3\} \sin \beta \cos (\gamma+\delta)/\cos \delta$ where $\beta$ is an angle of an incident optical axis to said first hologram, $\delta$ is an angle of an outgoing optical axis from said first hologram, $\alpha$ is an angle of an outgoing optical axis from said second hologram, $l_4$ is a distance on an optical axis from said first hologram to said second hologram, and $l_3$ is a distance from a light source of the spherical wave that enters said second hologram to said second hologram.

6. A hologram optical system as set forth in claim 5, further satisfying the following relationships:

$-U+V+W=0$ $U=\cos^2 \alpha/(2l_1)$ $V=\{(l_4/(2l_3^2)\} \cos^2(\gamma+\delta)\{(l_3-l_4)/l_3^2\} \sin \gamma \sin \delta \cos (\gamma+\delta)/\cos^2 \delta$ $W=-\{(l_3-l_4)/l_3^2\} \cos (\gamma+\delta)/\cos^2 \delta\{ \sin \beta \sin \delta-(l_3-l_4)/(2l_2) \cos^2 \beta \cos (\gamma+\delta)\}$ where $l_2$ is a distance on an optical axis from a light point of the divergent spherical wave that enters said first hologram to said first hologram, and $l_1$ is a distance on an optical axis from a light point of the divergent spherical wave that exits said second hologram to said second hologram.

7. A hologram optical system as set forth in claim 6, wherein each of said first and second holograms is a reflection type hologram.

8. A hologram optical system as set forth in claims 6, wherein each of said first and second holograms is a transmission type hologram.

9. A hologram optical system as set forth in claim 6, wherein one of said first and second holograms is a transmission type hologram, and the other is a reflection type hologram.

10. A hologram optical system as set forth in claim 5, wherein each of said first and second holograms is a reflection type hologram.

11. A hologram optical system as set forth in claim 5, wherein each of said first and second holograms is a transmission type hologram.

12. A hologram optical system as set forth in claim 5, wherein one of said first and second holograms is a transmission type hologram, and the other is a reflection type hologram.

13. A hologram optical system as set forth in claim 5, applied to a video display unit having a light source for emitting information light to said first hologram.

14. An achromatic hologram optical system, comprising:
two holograms for converting a wave front A into a wave front B, the length of an optical path from an equiphase front of the wave front A to an equiphase front of the wave front B is constant, and each of said two holograms has a curved surface shape, said two holograms are inclined by $\gamma$ with respect to each other, a first one of said two holograms converts a divergent spherical wave into another divergent spherical wave, a second one of said two holograms converts a divergent spherical wave into a convergent spherical wave, and the following relationships are established:

$R+S+T=0$ $R=-\sin \alpha$ $S=-\{(l_3-l_4)/l_3\} \cos (\gamma+\delta) \tan \delta+\sin (\gamma+\delta)=(l_4/l_3) \sin (\gamma+\delta)+\{l_3-l_4)/l_3\} \sin \gamma/\cos \delta$ $T=\{(l_3-l_4)/l_3\} \sin \beta \cos (\gamma+\delta)/\cos \delta$ where $\beta$ is an angle of an incident optical axis to said first hologram, $\delta$ is an angle of an outgoing optical axis from said first hologram, $\alpha$ is an angle of an outgoing optical axis from said second hologram, $l_4$ is a distance on an optical axis from said first hologram to said second hologram, and $l_3$ is a distance from a light source of the spherical wave that enters said second hologram to said second hologram.

15. A hologram optical system as set forth in claim 14, further satisfying the following relationships:

$U+V+W=0$ $U=-\cos^2 \alpha/(2l_1)$ $V=\{(l_4/(2l_3^2)\} \cos^2(\gamma+\delta)\{(l_3-l_4)/l_3^2\} \sin \gamma \sin \delta \cos (\gamma+\delta)/\cos^2 \delta$ $W=-\{(l_3-l_4)/l_3^2\} \cos (\gamma+\delta)/\cos^2 \delta\{ \sin \beta \sin \gamma-(l_3-l_4)/(2l_2) \cos^2 \beta \cos (\gamma+\delta)\}$ where $l_2$ is a distance on an optical axis from a light point of the divergent spherical wave that enters said first hologram to said first hologram, and $l_1$ is a distance of a light point of the divergent spherical wave emitted from said second hologram, from said second hologram, on an optical axis.

16. A hologram optical system as set forth in claim 15, wherein each of said first and second holograms is a reflection type hologram.

17. A hologram optical system as set forth in claim 15, wherein each of said first and second holograms is a transmission type hologram.

18. A hologram optical system as set forth in claim 15, wherein one of said first and second holograms is a transmission type hologram, and the other is a reflection type hologram.

19. A hologram optical system as set forth in claim 14, wherein each of said first and second holograms is a reflection type hologram.

20. A hologram optical system as set forth in claim 14, wherein each of said first and second holograms is a transmission type hologram.

21. A hologram optical system as set forth in claim 14, wherein one of said first and second holograms is a transmission type hologram, and the other is a reflection type hologram.

22. An achromatic hologram optical system, comprising:
two holograms for converting a wave front A into a wave front B, the length of an optical path from an equiphase front of the wave front A to an equiphase front of the wave front B is constant, and each of said two holograms has a curved surface shape, said two holograms are inclined by $\gamma$ with respect to each other, a first one of said two holograms converts a convergent spherical wave into a divergent spherical wave, a second one of said two holograms converts a divergent spherical wave into another divergent spherical wave, and the following relationships are established:

$R+S+T=0$ $R=-\sin \alpha$ $S=-\{(l_3-l_4)/l_3\} \cos (\gamma+\delta) \tan \delta+\sin (\gamma+\delta)=(l_4/l_3) \sin (\gamma+\delta)+\{(l_3-l_4)/l_3\} \sin \gamma/ \cos \delta$ $T=\{(l_3-l_4)/l_3\} \sin \beta \cos (\gamma+\delta)/ \cos \delta$ where $\beta$ is an angle of an incident optical axis to said first hologram, $\delta$ is an angle of an outgoing optical axis from said first hologram, $\alpha$ is an angle of an outgoing optical axis from said second hologram, $l_4$ is a distance on an optical axis from said first hologram to said second hologram, and $l_3$ is a distance from a light source of the spherical wave that enters said second hologram to said second hologram.

23. A hologram optical system as set forth in claim 22, further satisfying the following relationships:

$-U+V+W=0$ $U=\cos^2 \alpha/(2l_1)$ $V=\{(l_4/(2l_3^2)\} \cos^2(\gamma+\delta)\{(l_3-l_4)/l_3^2\} \sin \gamma \sin \delta \cos (\gamma+\delta)/ \cos^2 \delta$ $W=-\{(l_3-l_4)/l_3^2\} \cos (\gamma+\delta)/ \cos^2\delta\{ \sin \beta \sin \gamma-(l_3-l_4)/(2l_2) \cos^2 \beta \cos (\gamma+\delta)\}$ where $l_2$ is a distance on an optical axis from a light point of the divergent spherical wave that enters said first hologram to said first hologram, and $l_1$ is a distance of a light point of the divergent spherical wave emitted from said second hologram, from said second hologram, on an optical axis.

24. A hologram optical system as set forth in claim 23, wherein each of said first and second holograms is a reflection type hologram.

25. A hologram optical system as set forth in claim 23, wherein each of said first and second holograms is a transmission type hologram.

26. A hologram optical system as set forth in claim 23, wherein one of said first and second holograms is a transmission type hologram, and the other is a reflection type hologram.

27. A hologram optical system as set forth in claim 22, wherein each of said first and second holograms is a reflection type hologram.

28. A hologram optical system as set forth in claim 22, wherein each of said first and second holograms is a transmission type hologram.

29. A hologram optical system as set forth in claim 22, wherein one of said first and second holograms is a transmission type hologram, and the other is a reflection type hologram.

30. An achromatic hologram optical system, comprising:
two holograms for converting a wave front A into a wave front B, the length of an optical path from an equiphase front of the wave front A to an equiphase front of the wave front B is constant, and said two holograms are joined with a divergent wave or a convergent wave, said two holograms are inclined by $\gamma$ with respect to each other, a first one of said two holograms converts a divergent spherical wave into a convergent spherical wave, a second one of said two holograms converts a convergent spherical wave into a divergent spherical wave, and the following relationships are established:

$R+S'+T'=0$ $S'=-\{l_4/(l_3-l_4)\} \sin (\gamma+\delta)+\{l_3/(l_3-l_4)\} \sin \gamma/ \cos \delta$ $T'=\{l_3/(l_3-l_4)\} \sin \beta \cos (\gamma+\delta)/ \cos \delta$ where $\beta$ is an angle of an incident optical axis to said first hologram, $\delta$ is an angle of an outgoing optical axis from said first hologram, $\alpha$ is an angle of an outgoing optical axis of said second hologram, $l_4$ is a distance on an optical axis from said first hologram to said second hologram, and $l_3$ is a distance of a light source of the spherical wave incident upon said second hologram from said second hologram.

31. A hologram optical system as set forth in claim 30, further satisfying the following relationships:

$-U+V'+W'=0$ $V'=\{l_4/(l_3-l_4)^2/2\} \cos^2(\tau+\delta)-\{l_3/(l_3-l_4)^2\} \sin \gamma \sin \delta \cos (\gamma+\delta)/ \cos^2\delta$ $W'=-\{l_3/(l_3-l_4)^2\} \cos (\gamma+\delta)/ \cos^2\delta\{ \sin \beta \sin \gamma-l_3/(2l_2) \cos^2\beta \cos (\gamma+\delta)\}$ where $l_2$ is a distance on an optical axis from a light point of the divergent spherical wave that enters said first hologram to said first hologram, and $l_1$ is a distance of a light point of the divergent spherical wave emitted from said second hologram, from said second hologram, on an optical axis.

32. A hologram optical system as set forth in claim 31, wherein each of said first and second holograms is a reflection type hologram.

33. A hologram optical system as set forth in claim 31, wherein each of said first and second holograms is a transmission type hologram.

34. A hologram optical system as set forth in claim 31, wherein one of said first and second holograms is a transmission type hologram, and the other is a reflection type hologram.

35. A hologram optical system as set forth in claim 30, wherein each of said first and second holograms is a reflection type hologram.

36. A hologram optical system as set forth in claim 30, wherein each of said first and second holograms is a transmission type hologram.

37. A hologram optical system as set forth in claim 30, wherein one of said first and second holograms is a transmission type hologram, and the other is a reflection type hologram.

38. An achromatic hologram optical system for converting a wave front A into a wave front B, comprising:
at least three holograms in an achromatic system, the length of an optical path from an equiphase front of the wave front A to an equiphase front of the wave front B being constant, the length of the optical path defined by the (physical length from the wave front A to the wave front B)×(total refractive index), the wave fronts between holograms are not collimated waves, the wave fronts are a curved or plane surface normal to an outgoing direction of light, and an angle formed between first and second one of said at least three holograms is equal to an angle formed between second and third ones of said at least three holograms, and said first and third holograms are in parallel with each other.

39. An achromatic hologram optical system as set forth in claim 38, wherein said system is a coaxial optical system for converting a divergent spherical wave into a convergent spherical wave, in which a spatial frequency of each of said at least three holograms decreases in a radial direction.

40. A hologram optical system as set forth in claim 38, wherein an incident beam and an outgoing beam are plane waves that are in parallel with each other.

41. An achromatic hologram optical system, comprising:

two holograms in an achromatic system for converting a wave front A into a wave from B, the length of an optical path from an equiphase front of the wave front A to an equiphase front of the wave front B is constant, the optical path length defined by (physical length from to wave front A and wave front B)×(total refractive index), the wave front being a curved or plane surface normal to an outgoing direction of light, and each of said two holograms has a curved surface shape, said two holograms are inclined by $\gamma$ with respect to each other, a first one of said two holograms converts a divergent spherical wave into another divergent spherical wave, a second one of said two holograms converts a divergent spherical wave into a convergent spherical wave, and the following relationships are established:

$R+S+T=0$ $R=-\sin \alpha$ $S=-\{(l_3-l_4)/l_3\} \cos (\gamma+\delta) \tan \delta+\sin (\gamma+\delta)=(l_4/l_3) \sin (\gamma+\delta)+\{l_3-l_4)/l_3\} \sin \gamma/\cos \delta$ $T=\{(l_3-l_4)/l_3\} \sin \beta \cos (\gamma+\delta)/\cos \delta$ where $\beta$ is an angle of an incident optical axis to said first hologram, $\delta$ is an angle of an outgoing optical axis from said first hologram, $\alpha$ is an angle of an outgoing optical axis from said second hologram, $l_4$ is a distance on an optical axis from said first hologram to said second hologram, and $l_3$ is a distance from a light source of the spherical wave that enters said second hologram to said second hologram.

42. A hologram optical system as set forth in claim 41, further satisfying the following relationships:

$U+V+W=0$ $U=-\cos {}^2\alpha/(2l_1)$ $V=\{(l_4/(2l_3^2)\} \cos {}^2(\gamma+\delta)\{(l_3-l_4)/l_3^2\} \sin \gamma \sin \delta \cos (\gamma+\delta)/\cos {}^2\delta$ $W=-\{(l_3-l_4)/l_3^2\} \cos (\gamma+\delta)/\cos {}^2\delta\{\sin \beta \sin \gamma-(l_3-l_4)/(2l_2) \cos {}^2\beta \cos (\gamma+\delta)\}$ where $l_2$ is a distance on an optical axis from a light point of the divergent spherical wave that enters said first hologram to said first hologram, and $l_1$ is a distance of a light point of the divergent spherical wave emitted from said second hologram, from said second hologram, on an optical axis.

43. An achromatic hologram optical system comprising:

two holograms in an achromatic system for converting a wave front A into a wave front B, the length of an optical path from an equiphase front of the wave front A to an equiphase front of the wave front B is constant, the optical path length defined by (physical length from the wave front A and the wave front B)×(total refractive index) the wave front being a curved or plane surface normal to an outgoing direction of light, and a wave from a first one of said two holograms to a second one of said two holograms is a divergent wave or a convergent wave said two holograms are inclined by $\gamma$ with respect to each other, a first one of said two holograms converts a divergent spherical wave into another divergent spherical wave, a second one of said two holograms converts a divergent spherical wave into a convergent spherical wave, and the following relationships are established:

$R+S+T=0$ $R=-\sin \alpha$ $S=-\{(l_3-l_4)/l_3\} \cos (\gamma+\delta) \tan \delta+\sin (\gamma+\delta)=(l_4/l_3) \sin (\gamma+\delta)+\{l_3-l_4)/l_3\} \sin \gamma/\cos \delta$ $T=\{(l_3-l_4)/l_3\} \sin \beta \cos (\gamma+\delta)/\cos \delta$ where $\beta$ is an angle of an incident optical axis to said first hologram, $\delta$ is an angle of an outgoing optical axis from said first hologram, $\alpha$ is an angle of an outgoing optical axis from said second hologram, $l_4$ is a distance on an optical axis from said first hologram to said second hologram, and $l_3$ is a distance from a light source of the spherical wave that enters said second hologram to said second hologram.

44. A hologram optical system as set forth in claim 43, further satisfying the following relationships:

$-U+V+W=0$ $U=\cos {}^2\alpha/(2l_1)$ $V=\{(l_4/(2l_3^2)\} \cos {}^2(\gamma+\delta)\{(l_3-l_4)/l_3^2\} \sin \gamma \sin \delta \cos (\gamma+\delta)/\cos {}^2\delta$ $W=-\{(l_3-l_4)/l_3^2\} \cos (\gamma+\delta)/\cos {}^2\delta\{\sin \beta \sin \gamma-(l_3-l_4)/(2l_2) \cos {}^2\beta \cos (\gamma+\delta)\}$ where $l_2$ is a distance on an optical axis from a light point of the divergent spherical wave that enters said first hologram to said first hologram, and $l_1$ is a distance of a light point of the divergent spherical wave emitted from said second hologram, from said second hologram, on an optical axis.

45. An achromatic hologram optical system, comprising:

two holograms in an achromatic system for converting a wave front A into a wave front B, the length of an optical path from an equiphase front at an equiphase front of the wave front B is constant, the optical path length defined by (physical length from the wave front A and the wave front B)×(total refractive index), the wave front being a curved or plane surface normal to an outgoing direction of light, and a wave from a first one of said two holograms to a second one of said two holograms is a divergent wave or a convergent wave, said two holograms are inclined by $\gamma$ with respect to each other, a first one of said two holograms converts a convergent spherical wave into a divergent spherical wave, a second one of said two holograms converts a divergent spherical wave into another divergent spherical wave, and the following relationships are established:

$R+S+T=0$ $R=-\sin \alpha$ $S=-\{(l_3-l_4)/l_3\} \cos (\gamma+\delta) \tan \delta+\sin (\gamma+\delta)=(l_4/l_3) \sin (\gamma+\delta)+\{l_3-l_4)/l_3\} \sin \gamma/\cos \delta$ $T=\{(l_3-l_4)/l_3\} \sin \beta \cos (\gamma+\delta)/ \cos \delta$ where $\beta$ is an angle of an incident optical axis to said first hologram, $\delta$ is an angle of an outgoing optical axis from said first hologram, $\alpha$ is an angle of an outgoing optical axis from said second hologram, $l_4$ is a distance on an optical axis from said first hologram to said second hologram, and $l_3$ is a distance from a light source of the spherical wave that enters said second hologram to said second hologram.

46. An achromatic hologram optical system, comprising:

two holograms in an achromatic system for converting a wave front A into a wave front B, the length of an optical path from an equiphase front of the wave front A to an equiphase from of the wave from B is constant, and said two holograms are joined with a divergent wave or a convergent wave, said two holograms are inclined by $\gamma$ with respect to each other, a first one of said two holograms converts a divergent spherical wave into a convergent spherical wave, a second one of said two holograms converts a convergent spherical wave into a divergent spherical wave, and the following relationships are established:

$R+S'+T'=0$ $S'=-\{l_4/(l_3-l_4)\} \sin (\gamma+\delta)+\{l_3/(l_3-l_4)\} \sin \gamma/ \cos \delta$ $T'=\{l_3/(l_3-l_4)\} \sin \beta \cos (\gamma+\delta)/ \cos \delta$ where $\beta$ is an angle of an incident optical axis to said first hologram, $\delta$ is an angle of an outgoing optical axis from said first hologram, $\alpha$ is an angle of an outgoing optical axis of said second hologram, $l_4$ is a distance on an optical axis from said first hologram to said second hologram, and $l_3$ is a distance of a light source of the spherical wave incident upon said second hologram from said second hologram.

47. A hologram optical system as set forth in claim 46, further satisfying the following relationships:

$-U+V'+W'=0$ $V'=\{l_4/(l_3-l_4)^2/2\} \cos^2(\tau+\delta)-\{l_3/(l_3-l_4)^2\} \sin \gamma \sin \delta \cos (\gamma+\delta)/ \cos^2\delta$ $W'=-\{l_3/(l_3-l_4)^2\} \cos (\gamma+\delta)/ \cos^2\delta\{ \sin \beta \sin \gamma-l_3/(2l_2) \cos^2\beta \cos (\gamma+\delta)\}$ where $l_2$ is a distance on an optical axis from a light point of the divergent spherical wave that enters said first hologram to said first hologram, and $l_1$ is a distance of a light point of the divergent spherical wave emitted from said second hologram, from said second hologram, on an optical axis.

48. An achromatic hologram optical system, comprising:

two holograms in an achromatic system for converting a wave front A into a wave front B, the length of an optical path from an equiphase from of the wave front A to an equiphase front of the wave from B is Constant, the optical path length defined by (physical length from the wave front A and wave front B)×(total refractive index), the wave front being a curved or plane surface normal to an outgoing direction of light, and each of said two holograms has a curved surface shape, said two holograms are inclined by $\gamma$ with respect to each other, a first one of said two holograms converts a divergent spherical wave into a convergent spherical wave, a second one of said two holograms converts a convergent spherical wave into a divergent spherical wave, and the following relationships are established:

$R+S'+T'=0$ $S'=-\{l_4/(l_3-l_4)\} \sin (\gamma+\delta)+\{l_3/(l_3-l_4)\} \sin \gamma/ \cos \delta$ $T'=\{l_3/(l_3-l_4)\} \sin \beta \cos (\gamma+\delta)/ \cos \delta$ where $\beta$ is an angle of an incident optical axis to said first hologram, $\delta$ is an angle of an outgoing optical axis from said first hologram, $\alpha$ is an angle of an outgoing optical axis of said second hologram, $l_4$ is a distance on an optical axis from said first hologram to said second hologram, and $l_3$ is a distance of a light source of the spherical wave incident upon said second hologram from said second hologram.

49. A hologram optical system as set forth in claim 48, further satisfying the following relationships:

$-U+V'+W'=0$ $V'=\{l_4/(l_3-l_4)^2/2\} \cos^2(\tau+\delta)-\{l_3/(l_3-l_4)^2\} \sin \gamma \sin \delta \cos (\gamma+\delta)/ \cos^2\delta$ $W'=-\{l_3/(l_3-l_4)^2\} \cos (\gamma+\delta)/ \cos^2\delta\{ \sin \beta \sin \gamma-l_3/(2l_2) \cos^2\beta \cos (\gamma+\delta)\}$ where $l_2$ is a distance on an optical axis from a light point of the divergent spherical wave that enters said first hologram to said first hologram, and $l_1$ is a distance of a light point of the divergent spherical wave emitted from said second hologram, from said second hologram, on an optical axis.

50. An achromatic hologram optical system for converting a wave front A into a wave front B, comprising:

at least three holograms in an achromatic system, the length of an optical path from an equiphase front of the wave front A to an equiphase front of the wave front B being constant, the optical path length being defined by (physical length from the wave front A and the wave front B)×(total refractive index), the wave front being a curved or plane surface normal to an outgoing direction of light, said system is a coaxial optical system for converting a divergent spherical wave into a convergent spherical wave, in which a spatial frequency of each of said at three holograms decreases in a radial direction, the wave forms between the holograms are not collimated waves, an angle formed between first and second ones of said at least three holograms is equal to an angle formed between second and third ones of said at least three holograms, said first and third holograms are parallel with each other, said first and second holograms are not parallel with each other and said second and third holograms are not parallel with each other.

* * * * *

UNITED STATES PATENT AND TRADEMARK OFFICE
CERTIFICATE OF CORRECTION

PATENT NO. : 5,477,348
DATED : Dec. 19, 1995
INVENTOR(S) : YAMAGISHI et al.

It is certified that error appears in the above-indentified patent and that said Letters Patent is hereby corrected as shown below:

Col. 17, line 49 (claim 1, line 7), change "from" (both occurrences) to --front--;
line 50 (claim 1, line 8), change "from" to --front--.

Col. 23, line 15 (claim 41, line 3), change "from" to --front--.

Col. 25, line 55 (claim 48, line 4), change "from" (second occur.) to --front--.
line 56 (claim 48, line 5), change "Constant," to --constant,--.

Signed and Sealed this

Eighteenth Day of June, 1996

Attest:

BRUCE LEHMAN

Attesting Officer                    Commissioner of Patents and Trademarks